(12) United States Patent
Iwase

(10) Patent No.: US 10,603,885 B2
(45) Date of Patent: Mar. 31, 2020

(54) FUNCTIONAL COMPOSITE FILM AND WAVELENGTH CONVERSION FILM

(71) Applicant: FUJIFILM Corporation, Tokyo (JP)

(72) Inventor: Eijiro Iwase, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 246 days.

(21) Appl. No.: 15/657,923

(22) Filed: Jul. 24, 2017

(65) Prior Publication Data

US 2017/0320306 A1  Nov. 9, 2017

Related U.S. Application Data

(63) Continuation of application No. PCT/JP2016/050562, filed on Jan. 8, 2016.

(30) Foreign Application Priority Data

Feb. 2, 2015  (JP) ................. 2015-018611

(51) Int. Cl.
```
B32B 27/40      (2006.01)
F21V 9/30       (2018.01)
B32B 27/30      (2006.01)
B32B 27/18      (2006.01)
B32B 7/12       (2006.01)
G02B 5/02       (2006.01)
G02F 1/13357    (2006.01)
G02F 1/1335     (2006.01)
```
(52) U.S. Cl.
CPC ............... *B32B 27/40* (2013.01); *B32B 7/12* (2013.01); *B32B 27/18* (2013.01); *B32B 27/30* (2013.01); *F21V 9/30* (2018.02); *G02B 5/0242* (2013.01); *B32B 2307/40* (2013.01); *B32B 2309/105* (2013.01); *B32B 2310/0831* (2013.01); *G02B 2207/101* (2013.01); *G02F 1/1336* (2013.01); *G02F 2001/133614* (2013.01); *G02F 2202/36* (2013.01)

(58) Field of Classification Search
CPC .......... B32B 27/40; B32B 27/30; B32B 7/12; B32B 2307/40; B32B 2310/0831; B32B 2309/105; G02B 5/0242; G02B 2207/101
See application file for complete search history.

(56) References Cited

U.S. PATENT DOCUMENTS

| | | | | |
|---|---|---|---|---|
| 2014/0170345 A1* | 6/2014 | Aoshima | ................. | C08J 7/045 428/35.4 |
| 2015/0378089 A1* | 12/2015 | Oba | ...................... | G02B 6/005 349/70 |
| 2016/0009923 A1* | 1/2016 | Mitsumoto | .......... | C09D 151/06 428/336 |
| 2016/0091650 A1* | 3/2016 | Uchiumi | .............. | G02B 6/0065 349/61 |
| 2017/0199315 A1* | 7/2017 | Yonemoto | ................. | B32B 7/04 |

FOREIGN PATENT DOCUMENTS

| | | |
|---|---|---|
| JP | 2010-085501 A | 4/2010 |
| JP | 2010-265440 A | 11/2010 |
| JP | 2011-526646 A | 10/2011 |
| JP | 2013-544018 A | 12/2013 |
| WO | 2012/064562 A1 | 5/2012 |
| WO | 2014/046182 A1 | 3/2014 |

OTHER PUBLICATIONS

International Search Report issued in PCT/JP2016/050562 dated Apr. 12, 2016.
Written Opinion issued in PCT/JP2016/050562 dated Apr. 12, 2016.
International Preliminary Report on Patentability issued by WIPO dated Aug. 17, 2017, in connection with International Patent Application No. PCT/JP2016/050562.

* cited by examiner

*Primary Examiner* — Samir Shah
(74) *Attorney, Agent, or Firm* — Edwards Neils LLC; Jean C. Edwards, Esq.

(57) ABSTRACT

Provided are a functional composite film having one or more combinations of an inorganic layer and an underlying organic layer on one surface thereof, and having a light diffusion layer on the opposite surface, in which the light diffusion layer is formed by dispersing a light diffusing agent in a binder formed using a graft copolymer having a molecular weight of 10,000 to 3,000,000 and an acryl equivalent of 500 g/mol or more, which has an acrylic polymer as the main chain and at least one of a urethane polymer with an acryloyl group at a terminal or a urethane oligomer with an acryloyl group at a terminal in the side chain; and a wavelength conversion film using the same. Using these, a functional composite film and a wavelength conversion film, having good light diffusion performance and light transmittance are provided.

26 Claims, 1 Drawing Sheet

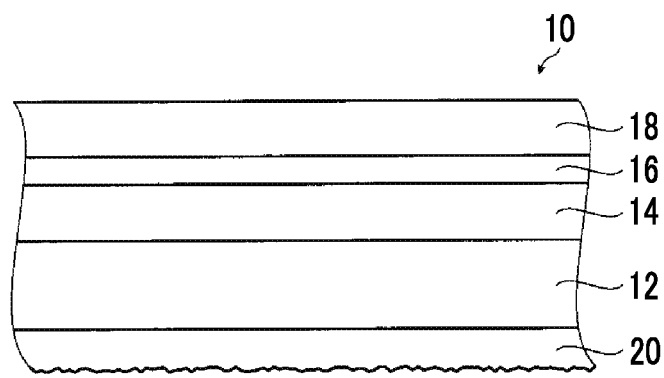
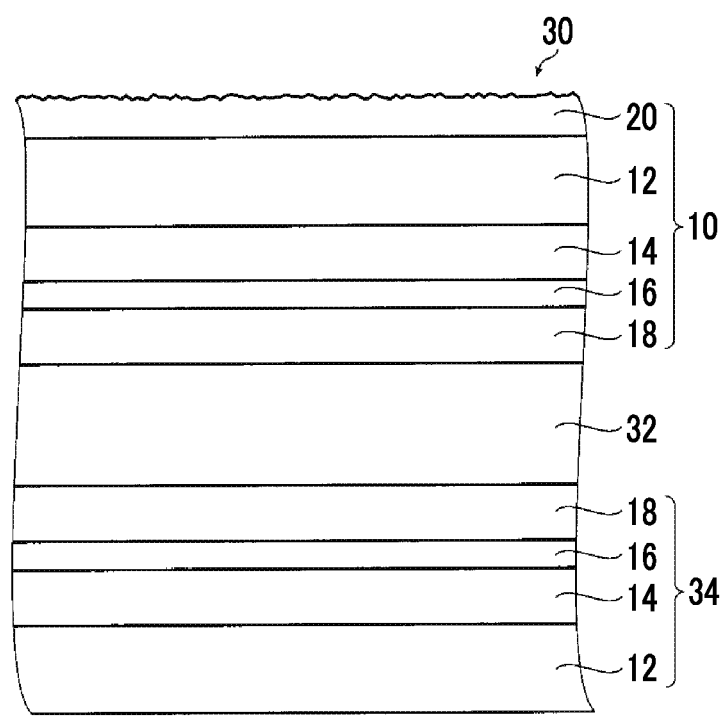

FUNCTIONAL COMPOSITE FILM AND WAVELENGTH CONVERSION FILM

CROSS-REFERENCE TO RELATED APPLICATIONS

This application is a Continuation of PCT International Application No. PCT/JP2016/050562 filed on Jan. 8, 2016, which was published under PCT Article 21(2) in Japanese, and which claims priority under 35 U.S.C. § 119(a) to Japanese Patent Application No. 2015-018611 filed on Feb. 2, 2015. The above applications are hereby expressly incorporated by reference, in their entirety, into the present application.

BACKGROUND OF THE INVENTION

1. Field of the Invention

The present invention relates to a functional composite film which exerts good light diffusibility and adhesiveness, and a wavelength conversion film using the functional composite film.

2. Description of the Related Art

A liquid crystal display device has been used widely more and more year by year as a space-saving image display device with low power consumption. Further, recently, as an improvement in the performance of liquid crystal display device, there have been demands for further power saving, enhancement in color reproducibility, and the like.

In the following description, a "liquid crystal display device" is also referred to as an "LCD".

It has been proposed to use quantum dots which emit light by conversion of the wavelength of an incidence ray in order to enhance light utilization efficiency and improve color reproducibility in response to a demand for power saving with respect to the backlight of an LCD.

Quantum dots are in the state of electrons having a limited moving direction in all three-dimensional directions, and in a case where nanoparticles of a semiconductor are three-dimensionally surrounded by high-potential barriers, these nanoparticles become quantum dots. The quantum dots express various quantum effects. For example, a so-called quantum size effect in which the densities of states (energy levels) of the electrons are discretized is expressed. According to this quantum size effect, the absorption wavelength/emission wavelength of light can be controlled by changing the size of the quantum dots.

Generally, such quantum dots are dispersed in a binder formed of resins such as an acrylic resin and an epoxy resin to become a quantum dot layer, which is disposed between a backlight and a liquid crystal panel, and used, for example, as a wavelength conversion film which performs wavelength conversion.

When excitation light is incident to a quantum dot layer from the backlight, the quantum dots are excited to emit fluorescent light. Here, white light can be realized by emitting light having a narrow half width, such as red light, green light, and blue light, by employing quantum dots having different light emission characteristics. Since the fluorescent light derived from quantum dots has a narrow half width, it is possible to make a design such that the white light obtained by appropriately selecting the wavelength can be designed to have a high brightness or excellent color reproducibility.

However, the quantum dots have problems in that they are easily deteriorated by moisture or oxygen and have a reduction in light emission intensity due to a photo-oxidation reaction. Thus, protection of the quantum dot layer has been carried out by laminating gas barrier films on both surfaces of the quantum dot layer.

For example, JP2013-544018A describes a laminated wavelength conversion film (quantum dot film), in which quantum dots are protected by sandwiching a quantum dot layer between two gas barrier films, as a backlight unit for use in an LCD or the like.

Furthermore, JP2013-544018A describes a configuration in which an oxide layer expressing gas barrier properties, such as silicon oxide, titanium oxide, and aluminum oxide, is formed on a resin film such as a polyethylene terephthalate (PET) film as gas barrier films having a quantum dot layer sandwiched therebetween.

In addition, JP2013-544018A also describes that a light scattering layer (a layer having scattering particles) is provided in a portion other than the quantum dot layer.

SUMMARY OF THE INVENTION

The present inventors have expected that when a light scattering layer is provided in addition to a quantum dot layer as shown in JP2013-544018A, the dose of excitation light incident to the quantum dot layer or the dose of light emitted from the quantum dot layer is increased, and thus, the brightness of an LCD can be improved, and they have repeated studies thereon.

As a result, it has been demonstrated that it is possible to improve the brightness by providing a light scattering layer in a wavelength conversion film having a quantum dot layer, as compared with a case where there is no light scattering layer. If it is possible to achieve such an improvement of brightness, it can be expected that a clear image with high brightness can be displayed by an LCD, cost reduction can be achieved by reducing the amount of quantum dots being used in order to achieve constant brightness, and the thickness of a backlight unit can be reduced by reducing the thickness of the quantum dot layer.

However, the present inventors have found that even when such a light diffusion layer for improving brightness is formed, the light diffusion layer is yellowed by an ultraviolet ray effect in a process of producing a wavelength conversion film, dependent on the properties of the light diffusion layer, and a desired brightness cannot be realized in some cases with the light transmission wavelength of a wavelength-converted LED, in particular, with absorption of blue light on a shorter wavelength side. That is, even when the light diffusion layer is formed, a desired brightness is not necessarily obtained in the final products.

In addition, there are other factors which lead to a reduction in brightness. As also shown in JP2013-544018A, quantum dots (quantum dot materials) are vulnerable to oxygen or moisture. As a result, in the backlight unit described in JP2013-544018A, the quantum dots are prevented from being deteriorated due to moisture or the like by sandwiching the quantum dot layer between the gas barrier films.

Here, the adhesiveness between the gas barrier film and the quantum dot layer is critical. When the wavelength conversion film is processed into product forms such as a portable terminal and a display, various types of processing such as slit cutting and punching are performed. When the adhesiveness between the gas barrier film and the quantum dot layer is insufficient, peeling occurs in the processing step, from which oxygen or moisture penetrates, leading to the deterioration of quantum dot materials, and accordingly, there is a concern of causing a reduction in brightness.

That is, in a wavelength conversion film in which a quantum dot layer is sandwiched between the gas barrier films, there is a demand for a highly complex configuration in which light is sufficiently scattered by a light diffusion layer, and while the light diffusion layer minimizes the loss of transmitted light, the quantum dot layer is sandwiched between the gas barrier films, preferably with a high adhesive force, in order to eliminate the reduction in brightness of the wavelength conversion film.

As a method for solving this problem, a configuration in which gas barrier films having excessively good adhesiveness and a binder which forms a quantum dot layer are prepared; a polymerizable composition which becomes the quantum dot layer, formed by dispersing quantum dots in a curable compound, is sandwiched between the gas barrier films, and the quantum dot layer is cured by the irradiation with ultraviolet rays or the like to prepare a wavelength conversion film; and a light diffusion film is attached to one of the gas barrier films of the wavelength conversion film is considered.

However, in this configuration, there are concerns, for example, that the entire wavelength conversion film becomes thick, the number of parts is increased or the weight of the product is increased in terms of the configuration, or it is hard to conduct cutting. In addition, the configuration is disadvantageous for mobile phones and the like which are required to be thinner.

An object of the present invention lies in solving such problems in the related art, and is to provide a functional composite film having good handleability, expressing sufficient hardness when being used in a functional laminated film such as a quantum dot film, and being capable of preventing a reduction in brightness and also of improving the adhesiveness; and a wavelength conversion film using the functional composite film.

In order to solve these problems, a functional composite film having one or more combinations of an inorganic layer and an organic layer which becomes an underlying base of the inorganic layer on one surface of a support, and a light diffusion layer on the opposite surface to the surface of the support on which the organic layer and the inorganic layer are formed, in which the light diffusion layer is formed by dispersing light diffusing agents in a binder formed using a graft copolymer having a weight-average molecular weight of 10,000 to 3,000,000 and a double bond equivalent of 500 g/mol or more, which has an acrylic polymer as the main chain and at least one of a urethane polymer with an acryloyl group at a terminal or a urethane oligomer with an acryloyl group at a terminal in the side chain, is provided as the functional composite film of the present invention.

In such the functional composite film of the present invention, it is preferable that the difference n1−n2 between the refractive index n1 of the binder and the refractive index n2 of the light diffusing agent is 0.02 to 0.07, and the refractive index n1 of the binder is less than 1.5 in the light diffusion layer.

Furthermore, it is preferable that the mass of the binder/the mass of the light diffusing agent, which is the ratio of the mass of the binder to the mass of the light diffusing agent, is 0.1 to 0.8 in the light diffusion layer.

Moreover, it is preferable that the light diffusing agent contains two kinds of light diffusing agents having different sizes.

Incidentally, it is preferable that the particle diameter of the smaller light diffusing agents is 1 to 5 μm and the particle diameter of the larger light diffusing agents is 8 to 15 μm in the two kinds of light diffusing agents.

In addition, it is preferable that the mass of the small-diameter particles/the mass of the large-diameter particles, which is the ratio of a sum of the masses of the smaller light diffusing agents to a sum of the masses of the larger light diffusing agents, is 0.67 to 1.5.

Furthermore, it is preferable that the light diffusing agents are silicone resin particles.

Moreover, it is preferable that the thickness of the light diffusion layer is 5 to 25 μm.

Incidentally, it is preferable that the binder of the light diffusion layer is thermally cured.

In addition, it is preferable that in the surface having one or more combinations of an inorganic layer and an organic layer which becomes an underlying base of the inorganic layer, the outermost surface has an adhesive layer, and the adhesive layer is formed using an ultraviolet-curable urethane polymer having a weight-average molecular weight of 5,000 to 30,000 and a double bond equivalent of 300 g/mol or more, which has a urethane polymer as the main chain and a side chain having a (meth)acryloyl group at a terminal; a curable urethane polyester; and at least one of a phosphoric acid compound containing two or less (meth)acryloyl groups or a silane coupling agent containing one (meth)acryloyl group.

Furthermore, it is preferable that the adhesive layer includes a photopolymerization initiator.

Incidentally, it is preferable that the adhesive layer includes a lubricant.

Moreover, it is preferable that the lubricant is a silicon particle.

Incidentally, it is preferable that the thickness of the adhesive layer is 10 to 1,000 nm.

In addition, it is preferable that the adhesive layer is formed by thermal curing.

Furthermore, it is preferable that a wavelength conversion film in which a quantum dot layer formed by dispersing quantum dots in a binder is sandwiched between the functional composite film of the present invention and a gas barrier film having one or more combinations of an inorganic layer and an organic layer which becomes the underlying base of the inorganic layer on one surface of a support, with the surface of the inorganic layer side being the inner side, is provided as the wavelength conversion film of the present invention.

In such the wavelength conversion film of the present invention, it is preferable that the gas barrier film has an organic layer which becomes an adhesive layer on the outermost surface of the surface on which the organic layer and the inorganic layer are formed.

Further, it is preferable that the adhesive layer of the gas barrier film is formed using an ultraviolet-curable urethane polymer having a weight-average molecular weight of 5,000 to 30,000 and a double bond equivalent of 300 g/mol or more, which has a urethane polymer as the main chain and a side chain having a (meth)acryloyl group at a terminal; a curable urethane polyester; and at least one of a phosphoric acid compound containing two or less (meth)acryloyl groups or a silane coupling agent containing one (meth)acryloyl group.

Furthermore, it is preferable that the adhesive layer of the gas barrier film includes a photopolymerization initiator.

Incidentally, it is preferable that the adhesive layer of the gas barrier film includes a lubricant.

Moreover, it is preferable that the lubricant is a silicon particle.

Incidentally, it is preferable that the thickness of the adhesive layer of the gas barrier film is 10 to 1,000 nm.

In addition, the adhesive layer of the gas barrier film is formed by thermal curing.

Furthermore, it is preferable that the binder of the quantum dot layer is formed by polymerizing a compound having a molecular weight of 500 or less as a main component.

Incidentally, it is preferable that the binder of the quantum dot layer is a (meth)acrylic resin.

In addition, it is preferable that the quantum dot layer is formed by ultraviolet curing, and during the ultraviolet curing, the adhesive layer of the functional film and the adhesive layer of the gas barrier film are radically polymerized.

When such the functional composite film of the present invention has a predetermined light diffusion layer, the film has good handleability, expresses sufficient hardness when being used for a functional laminated film such as a quantum dot film, and can also prevent a reduction in brightness.

In addition, the wavelength conversion film of the present invention is a wavelength conversion film which enables light with high brightness to be irradiated by using the functional composite film of the present invention.

BRIEF DESCRIPTION OF THE DRAWINGS

FIG. 1 is a view conceptually showing an example of a functional composite film of the present invention.

FIG. 2 is a view conceptually showing an example of a wavelength conversion film of the present invention.

DESCRIPTION OF THE PREFERRED EMBODIMENTS

Hereinbelow, the functional composite film and the wavelength conversion film of the present invention will be described in detail with reference to suitable Examples shown in the accompanying drawings.

In order to solve the above-mentioned problems, it is only required that in a laminated wavelength conversion film (quantum dot film) formed by sandwiching a quantum dot layer with gas barrier films, a light diffusion layer may be directly formed on the surface of one of the gas barrier films, and preferably the surface of the gas barrier film, opposite to the light diffusion layer, has very good adhesiveness to the quantum dot layer.

In addition, it is possible to solve all the problems by making the light diffusion layer not yellow when a polymerizable composition, which becomes a quantum dot layer formed by dispersing quantum dots in a curable compound, is sandwiched between the gas barrier film integrated with the light diffusion layer and the gas barrier film not having the light diffusion layer, and cured by the irradiation with ultraviolet rays, or the like.

For this purpose, it is preferable that an adhesive layer having high adhesiveness to the quantum dot layer is formed on the outermost surface of the gas barrier film. It is more preferable that the adhesive layer sufficiently has unreacted double bonds to be easily bonded with a curable compound (radical polymerization binder) which forms the quantum dot layer, and further, maintains hardness and thickness to a certain degree as a coating film so as to function as a protective layer when the diffusion layer is formed on the opposite surface.

Furthermore, when forming the light diffusion layer, in order not to accelerate the reaction of radical polymerization in the adhesive layer formed above, it is preferable to form the light diffusion layer by thermal curing. For this purpose, the light diffusion layer may be formed using a thermosetting resin. However, the diffusion layer formed with the thermosetting resin may not have scratch resistance, which is required in the final products, in some cases. Accordingly, the light diffusion layer is preferably formed with an ultraviolet-curing resin which has high crosslinking properties to some extent.

That is, it is desirable that the light diffusion layer is prescriptively configured to be cured to a level which does not pose a problem in handling in the thermal curing, and be completely cured by ultraviolet curing which is carried out finally. Further, yellowing of the light diffusion layer with ultraviolet rays is preferably minimized, and the light diffusion layer is desired to be a resin having a low refractive index and high transparency in order to increase the transmittance of light. Essentially, in spite of these, in order to give high scattering properties, the refractive index, size, or content ratio of the particles which become a diffusing agent is important.

In this regard, a functional composite film having the light diffusion layer of the present invention is configured such that final curing of the light diffusion layer is carried out at the same time as the curing of the polymerizable composition or additionally the adhesive layer with ultraviolet rays after sandwiching the polymerizable composition which becomes a quantum dot layer therebetween in the manufacture of a wavelength conversion film is carried out. Thus, the light diffusion layer can be prevented from yellowing by not performing excessive irradiation with ultraviolet rays. By realizing these, the present invention makes it possible to provide a wavelength conversion film for a backlight, which suppresses a reduction in brightness, that is, has high brightness.

FIG. 1 is a view conceptually showing an example in which a functional composite film of the present invention is used in a gas barrier film.

Further, the functional composite film of the present invention is not limited to the gas barrier film. That is, the present invention can be used in various known functional composite films, including, for example, various optical films such as filters that transmit light at a specific wavelength and antireflection films.

Here, the functional composite film of the present invention preferably has an adhesive layer on the outermost surface, and the inorganic layer can be protected with the adhesive layer, whereby it is possible to obtain a functional composite film having an inorganic layer with no defects such as lines and cracks. In addition, the functional composite film of the present invention can enhance the adhesiveness with an organic compound due to the incorporation of a predetermined adhesive layer therein.

Therefore, the functional composite film of the present invention is used in applications for protecting a functional layer formed by dispersing materials vulnerable to moisture in a binder formed of a resin or the like, and is more suitably used in a gas barrier film having significant deterioration of performance due to damage of the inorganic layer or interlayer peeling with a functional layer.

The gas barrier film 10 shown in FIG. 1 basically has a support 12, an underlying organic layer 14 formed on one surface of the support, an inorganic layer 16, and an adhesive layer 18 on the outermost surface. Further, a light diffusion layer 20 is formed on the surface opposite to the surface of the support 12, on which the underlying organic layer 14 or the inorganic layer 16 is formed.

In addition, the adhesive layer 18 on the outermost surface is provided in a preferred aspect.

That is, the gas barrier film 10 shown in FIG. 1 has one combination of the underlying organic layer 14 and the inorganic layer 16. However, the functional composite film of the present invention can also use various configurations other than those above.

For example, the functional composite film may be configured to have two combinations of the underlying organic layer 14 and the inorganic layer 16, and further have the adhesive layer 18 on the outermost surface. Alternatively, it may be configured to have three or more combinations of the underlying organic layer 14 and the inorganic layer 16, and further have the adhesive layer 18 on the outermost surface.

Alternatively, the functional composite film may be configured to have the inorganic layer 16 formed on the surface of the support 12, and have one or more combinations of the underlying organic layer 14 and the inorganic layer 16 thereon.

That is, for the functional composite film of the present invention, any various configurations can be used as long as they have an organic/inorganic laminated structure with one or more combinations of an inorganic layer and an organic layer which becomes an underlying base of the inorganic layer.

In the gas barrier film 10, as the support 12, various known materials in a sheet form, which are used as a support in various gas barrier films or various laminated functional films.

Specifically, suitable examples of the support 12 include films (resin films) formed of various resin materials, such as polyethylene (PE), polyethylene naphthalate (PEN), polyamide (PA), polyethylene terephthalate (PET), polyvinyl chloride (PVC), polyvinyl alcohol (PVA), polyacrylonitrile (PAN), polyimide (PI), transparent polyimide, a methyl polymethacrylate resin (PMMA), polycarbonate (PC), polyacrylate, polymethacrylate, polypropylene (PP), polystyrene (PS), ABS, a cyclic olefin/copolymer (COC), a cycloolefin polymer (COP), and triacetyl cellulose (TAC).

Furthermore, in the present invention, a support having a layer (film) for obtaining various functions, such as a protective layer, an adhesive layer, a light reflecting layer, an antireflection layer, a light shielding layer, a planarizing layer, a buffer layer, and a stress relaxation layer, formed on the surface thereof, is used as the support 12.

In addition, the support 12 preferably has high transmittance to ultraviolet rays.

In the wavelength conversion film of the present invention, which will be described later, the quantum dot layer is formed by applying a polymerizable composition (curable composition) which becomes the quantum dot layer onto the adhesive layer 18 of the gas barrier film 10, laminating the other gas barrier film, and then curing the polymerizable composition by the irradiation with ultraviolet rays. Accordingly, in order to form the quantum dot layer properly, the support 12 preferably has high transmittance to ultraviolet rays.

The thickness of the support 12 may be appropriately set, depending on applications, forming materials, or the like.

According to the studies of the present inventors, the thickness of the support 12 is preferably 5 to 100 µm, and more preferably 10 to 50 µm.

It is preferable to set the thickness of the support 12 within the above range, for example, in views that the mechanical strength of the functional composite film 10 is sufficiently secured, and further, the functional composite film 10 can be lighter, thinner, and more flexible. Further, by setting the thickness of the support 12 within the above range, the wavelength conversion film of the present invention, which will be described later, can be made thinner.

The gas barrier film 10 has an underlying organic layer 14 on the support 12, as an underlying layer of the inorganic layer 16.

The underlying organic layer 14 is a layer formed of organic compounds, which is basically obtained by the polymerization (crosslinking) of monomers or oligomers which become the underlying organic layer 14.

The underlying organic layer 14 of the support 12 functions as an underlying layer for properly forming an inorganic layer 16 that usually expresses gas barrier properties in the gas barrier film 10.

By incorporation of such an underlying organic layer 14, irregularities on the surface of the support 12 (or the inorganic layer 16 formed on the surface of the support 12), foreign substance attached to the surface of the support 12, and the like can be embedded to make the deposition surface of the inorganic layer 16 be in a state which is suitable for forming the inorganic layer 16. Thus, it is possible to remove regions in which it is difficult to form an inorganic compound which becomes the inorganic layer 16 to deposit a film, such as irregularities and shadows of foreign substances on the surface of the support 12, thereby forming a proper inorganic layer 16 without gaps on the entire surface of the substrate.

In the gas barrier film 10, the forming materials of the underlying organic layer 14 are not limited, and various known organic compounds can be used.

Suitable examples thereof include thermoplastic resins such as polyesters, (meth)acrylic resins, methacrylic acid-maleic acid copolymers, polystyrene, transparent fluororesins, polyimide, fluorinated polyimide, polyamide, polyamideimide, polyetherimide, cellulose acylate, polyurethane, polyether ether ketone, polycarbonate, alicyclic polyolefin, polyarylate, polyether sulfone, polysulfone, fluorene ring-modified polycarbonate, alicyclic-modified polycarbonate, fluorene ring-modified polyester, and acrylic compounds; and films of polysiloxane and other organosilicon compounds. A plurality of these compounds may be used in combination.

Among those, the underlying organic layer 14 constituted with polymerized products of radically curable compounds and/or cationically curable compounds having an ether group as a functional group are suitable in views of excellent glass transition temperature or strength, and the like.

Among those, in particular, in views of a low refractive index, high transparency, excellent optical characteristics, and the like, acrylic resins or methacrylic resins having polymers of the monomers or oligomers of acrylate and/or methacrylate as a main component are suitably exemplified as the underlying organic layer 14.

Among those, in particular, acrylic resins or methacrylic resins having bifunctional or higher, in particular, trifunctional or higher polymers of the monomers or the oligomers of acrylate and/or methacrylate as a main component, such as dipropylene glycol di(meth)acrylate (DPGDA), trimethylolpropane tri(meth)acrylate (TMPTA), and dipentaerythritol hexa(meth)acrylate (DPHA) are suitably exemplified. Further, it is also preferable that a plurality of these acrylic resins or methacrylic resins are used.

The thickness of the underlying organic layer 14 may be appropriately set, depending on the forming materials of the underlying organic layer 14 or the support 12. According to the studies of the present inventors, the thickness of the underlying organic layer 14 is preferably set to 0.5 to 5 µm, and more preferably set to 1 to 3 µm.

Therefore, by setting the thickness of the underlying organic layer 14 to 0.5 µm or more, the irregularities on the surface of the support 12 or the foreign substance attached to the surface of the support 12 can be embedded to planarize the surface of the underlying organic layer 14, that is, the deposition surface of the inorganic layer 16.

Furthermore, by setting the thickness of the underlying organic layer 14 to 5 µm or less, occurrence of problems such as cracking of the underlying organic layer 14 and curling of the gas barrier film 10, caused by the excessively large thickness of the underlying organic layer 14, can be suitably suppressed.

Moreover, in a case where a plurality of the underlying organic layers 14 are included as described above, the thickness of the respective underlying organic layers 14 may be the same as or different from each other. Further, in a case where a plurality of the underlying organic layers 14 are included, the forming materials of the respective underlying organic layers 14 may be the same as or different from each other.

Such an underlying organic layer 14 may be formed (film formation) by a known method for forming a layer formed of organic compounds, depending on the underlying organic layer 14 to be formed.

By way of an example, the underlying organic layer 14 may be formed by a so-called coating method, which includes preparing a coating composition including an organic solvent, organic compounds (monomers, dimers, trimers, oligomers, polymers, and the like), which become the underlying organic layer 14, a surfactant, and a silane coupling agent; applying and drying the coating composition; and if desired, polymerizing (crosslinking) the organic compounds by the irradiation with ultraviolet rays, or the like.

In addition, the underlying organic layer 14 is preferably formed by a so-called roll-to-roll method. In the following description, the "roll-to-roll" is also referred to as "R-to-R".

As well-known, R-to-R is a production method in which a material on which a film is formed is drawn from a material roll formed by rolling up the material on which a film is formed having a long length into a roll shape, film formation is carried out while the drawn material on which a film is formed is transported in a longitudinal direction, and the material on which a film is formed for film formation is rolled into a roll shape. By using R-to-R, high productivity and production efficiency are obtained.

The inorganic layer 16 is a layer formed of inorganic compounds.

In the gas barrier film 10, the inorganic layer 16 usually expresses the desired gas barrier properties.

The forming materials of the inorganic layer 16 are not limited, and various layers formed of inorganic compounds expressing gas barrier properties can be used.

Specifically, films formed of inorganic compounds including metal oxides such as aluminum oxide, magnesium oxide, tantalum oxide, zirconium oxide, titanium oxide, and indium tin oxide (ITO); metal nitrides such as aluminum nitride; metal carbides such as aluminum carbide; oxides of silicon such as silicon oxide, silicon oxynitride, silicon oxycarbide, and silicon oxynitrocarbide; nitrides of silicon such as silicon nitride and silicon nitrocarbide; carbides of silicon such as silicon carbide; hydrides of these compounds; and hydrogenated products thereof are suitably exemplified. Further, a mixture of two or more of these compounds can also be used.

Particularly, silicon nitride, silicon oxide, silicon oxynitride, aluminum oxide, and a mixture of two or more thereof are suitably used since these compounds have high transparency and are capable of expressing excellent gas barrier properties. Among these, in particular, silicon nitride is suitably used since it has high transparency as well as excellent gas barrier properties.

As the film thickness of the inorganic layer 16, a thickness capable of expressing gas barrier properties may be appropriately determined depending on the forming materials. According to the studies of the present inventors, the thickness of the inorganic layer 16 is preferably 10 to 200 nm, more preferably 15 to 100 nm, and particularly preferably 20 to 75 nm.

By setting the thickness of the inorganic layer 16 to 10 nm or more, the inorganic layer 16 that stably expresses sufficient gas barrier performance can be formed. Further, the inorganic layer 16 is generally brittle, and thus, if it is excessively thick, it can cause generation of cracking, lines, peeling, or the like, whereas by setting the thickness of the inorganic layer 16 to 200 nm or less, the generation of cracks can be prevented.

Furthermore, in a case of a plurality of inorganic layers 16 included as described above, the thickness of the respective inorganic layers 16 may be the same as or different from each other. Further, in a case of a plurality of the inorganic layers 16 are included, the forming materials of the respective inorganic layers 16 may be the same as or different from each other.

In the gas barrier film 10, a film forming method for the inorganic layer 16 is not limited, and various known methods for forming inorganic layers (inorganic films) can be used, depending on the inorganic layer 16 to be formed.

Specifically, the inorganic layer 16 may be formed by vapor-phase film forming methods including plasma CVDs such as CCP-CVD and ICP-CVD, sputtering such as magnetron sputtering and reactive sputtering, and vacuum vapor deposition.

In addition, the inorganic layer 16 is also preferably formed by R-to-R.

In the gas barrier film 10, in a preferred aspect, the adhesive layer 18 which is the outermost surface is placed on the inorganic layer 16.

The adhesive layer 18 is formed to protect the inorganic layer 16 as well as to obtain high adhesiveness to a functional layer formed by dispersing particles expressing functions in a binder formed of organic compounds, such as a quantum dot layer.

It is known that a quantum dot layer is sandwiched between the gas barrier films in order to protect quantum dots vulnerable to moisture as described above.

In order to secure sufficient gas barrier properties, it is necessary that the gas barrier film use an inorganic layer formed of silicon nitride, silicon oxide, and the like. On the other hand, the quantum dot layer is formed by dispersing quantum dots in an acrylic resin or the like. Thus, a laminate having a quantum dot layer sandwiched between gas barrier films has deteriorated adhesiveness between the gas barrier films and the quantum dot layer, and thus, moisture penetrates into the quantum dot layer due to interlayer peeling, which leads to deterioration of the quantum dot layer.

Furthermore, it is possible to secure the adhesiveness by forming a layer including the silane coupling agent, and the like. However, there is a possibility that heat, acids, or alkalis required to exert the action of the silane coupling agent can have adverse effects on the quantum dots, and the inorganic layer can be damaged due to an increased number of steps.

In contrast, the gas barrier film 10 of the present invention has the adhesive layer 18 on the inorganic layer 16. The adhesive layer 18 is an organic layer formed of organic compounds.

Preferably, the adhesive layer 18 is formed by using an ultraviolet-curable urethane polymer having a weight-average molecular weight of 5,000 to 30,000 and a double bond equivalent of 300 g/mol or more, which has a urethane polymer as the main chain and a side chain having a (meth)acryloyl group at a terminal; a curable urethane polyester; and at least one of a phosphoric acid compound containing two or less (meth)acryloyl groups or a silane coupling agent containing one (meth)acryloyl group.

In the following description, "the ultraviolet-curable urethane polymer having a weight-average molecular weight of 5,000 to 30,000 and a double bond equivalent of 300 g/mol or more, which has a urethane polymer as the main chain and a side chain having a (meth)acryloyl group at a terminal" is also referred to as a "UV-curable urethane polymer".

More preferably, the adhesive layer 18 is formed by curing the main chain (urethane polymer main chain) of the UV-curable urethane polymer and the curable urethane polyester, using a polymerizable composition including the above compounds. Particularly preferably, the adhesive layer 18 is formed by thermally curing the main chain of the UV-curable urethane polymer and the curable urethane polyester, using a polymerizable composition including the above-mentioned compounds.

The adhesive layer 18 formed of such a UV-curable urethane polymer is configured to be formed by dispersing the phosphoric acid compound and/or the silane coupling agent, containing uncrosslinked (meth)acryloyl groups, in a matrix (netted structure/network) formed from the main chain of the UV-curable urethane polymer and the curable urethane polyester, crosslinked by curing; from the main chains of the UV-curable urethane polymers with each other; and from the curable urethane polyesters with each other.

Furthermore, the terminal (meth)acryloyl group in the side chain of the UV-curable urethane polymer preferably remains uncrosslinked.

In this case, the adhesive layer 18 has the surface in the cured state. Accordingly, the gas barrier film 10 of the present invention, having such an adhesive layer 18, can be wound, and accordingly, it can also suitably be used in R-to-R.

In addition, by incorporation of the adhesive layer 18 having the surface in the cured state, the adhesive layer 18 acts as a protective layer, and therefore, damages on the inorganic layer 16 can also be prevented.

Furthermore, the inorganic layer 16 such as a silicon nitride layer, formed by a vapor-phase film forming method such as plasma CVD has the surface oxidized by the contact with air, and thus, an —OH group or the like is introduced thereto. On the other hand, when the main chain of the UV-curable urethane polymer and the curable urethane polyester are cured, a hydrolysis reaction of the silane coupling agent proceeds. Further, the phosphoric acid compound has an —OH group. Thus, the inorganic layer 16 forms a covalent bond or a hydrogen bond directly with the phosphoric acid compound or the silane coupling agent included in the adhesive layer 18. As a result, the adhesiveness between the inorganic layer 16 and the adhesive layer 18 can also be secured.

Furthermore, the phosphoric acid compound has two or less uncrosslinked (meth)acryloyl groups. The silane coupling agent has one uncrosslinked (meth)acryloyl group. In addition, the terminal (meth)acryloyl group in the side chain of the UV-curable urethane polymer remains uncrosslinked.

As a result, as in the light diffusion layer 20 which will be described later, when functional layers such as a quantum dot layer are formed on the adhesive layer 18 of the gas barrier film 10, the uncrosslinked groups of the binder of the functional layer (preferably an uncrosslinked (meth)acryloyl group), the (meth)acryloyl group of the phosphoric acid compound and/or the silane coupling agent, and the terminal (meth)acryloyl group of the side chain of UV-curable urethane polymer are reacted with and bonded to each other by the irradiation with ultraviolet rays, or the like for curing the functional layer, and the adhesiveness between the functional layer and the adhesive layer 18 can also be secured. Further, since the (meth)acryloyl group of the adhesive layer 18 is uncrosslinked and a compound which becomes the binder when the functional layer is formed easily penetrates, the crosslinked structure extending from the inside of the functional layer to the inside of the adhesive layer 18 can be formed. From this viewpoint, the adhesiveness between the functional layer and the adhesive layer 18 can be enhanced. In addition, since the crosslinking proceeds within the adhesive layer 18, the aggregation peeling of the adhesive layer 18, and the like can be prevented.

Furthermore, preferably by forming functional layers such as a quantum dot layer only by the irradiation with ultraviolet rays, the adhesiveness between the adhesive layer 18 and the functional layer can be secured, and therefore, deterioration of functional particles such as quantum dots caused by heating can also be prevented as in the case where the adhesiveness is secured with the silane coupling agent.

The UV-curable urethane polymer which forms the adhesive layer 18 is an ultraviolet-curable polymer having a weight-average molecular weight of 5,000 to 30,000 and a double bond equivalent of 300 g/mol or more, which has a urethane polymer as the main chain and a side chain having a (meth)acryloyl group at a terminal.

The main chain of the UV-curable urethane polymer is basically a known urethane polymer. Accordingly, it may be one formed by independently polymerizing each of a carbamic ester, a urethane oligomer unit, a urethane polymer unit, and the like, or may be a copolymer of any one of these polymers and other monomers, oligomers, or polymers.

Further, the carbamic ester, the urethane oligomer unit, and the urethane polymer unit may be the same as or different from each other.

The side chain bonded to the main chain (urethane polymer main chain) of the UV-curable urethane polymer has a (meth)acryloyl group at a terminal. As this side chain, various types can be used as long as they have a (meth)acryloyl group at a terminal.

Examples of such a side chain include an alkyl group with a linear or branched chain, having a (meth)acryloyl group at a terminal. As the alkyl group with a linear or branched chain, a linear alkyl group having 1 to 6 carbon atoms is preferable, and an n-propyl group, an ethyl group, and a methyl group are more preferably exemplified, with a methyl group being particularly preferable. The side chains having (meth)acryloyl groups at the terminals may all be the same ones or a mixture of different ones.

The UV-curable urethane polymer may have a side chain having no (meth)acryloyl group at a terminal.

Examples of the side chain having no (meth)acryloyl group at a terminal include an alkyl group with a linear or branched chain, an ethylene oxide group, a polyethylene oxide group, a propylene oxide group, and a polypropylene oxide group.

In addition, the side chains having no (meth)acryloyl group at the terminals may all be the same ones or a mixture of different ones.

As described above, the UV-curable urethane polymer which forms the adhesive layer 18 preferably has a weight-average molecular weight of 5,000 to 30,000.

It is preferable to set the weight-average molecular weight of the UV-curable urethane polymer to 5.000 or more, for example, in views that the adhesive layer 18 having a desired thickness by preventing evaporation with heating when the adhesive layer 18 is formed, can prevent the cissing of a film of the coating composition for forming the adhesive layer 18.

It is preferable to set the weight-average molecular weight of the UV-curable urethane polymer to 30,000 or less, for example, in views that a firm film is formed, and thus, aggregation peeling in the adhesive layer 18 can be prevented.

Taking the above-mentioned points into consideration, the weight-average molecular weight of the UV-curable urethane polymer is preferably 10,000 to 27,000.

Furthermore, in the present invention, the weight-average molecular weight (Mw) of various polymers (resins/polymer materials) may be measured as a molecular weight in terms of polystyrene (PS) by means of gel permeation chromatography (GPC). More specifically, the weight-average molecular weight may be determined using HLC-8220 (manufactured by Tosoh Corporation), and using TSKgel Super AWM-H (manufactured by Tosoh Corporation, 6.0 mmID×15.0 cm) and a 10-mmol/L lithium bromide NMP (N-methylpyrrolidinone) solution as an eluent.

As the weight-average molecular weight of polymers and the like, the numerical values described in the catalogues and the like may be used.

The UV-curable urethane polymer which forms the adhesive layer 18 preferably has a double bond equivalent (acryl equivalent) of 300 g/mol or more. The double bond equivalent is the weight-average molecular weight (polymer mass) per mole of a polymerizable double bond (that is, a (meth)acryloyl group) included in the UV-curable urethane polymer.

In a case where the double bond equivalent of the UV-curable urethane polymer is less than 300 g/mol, failures such as an extreme increase in the crosslinking density due to an excessive number of double bonds, that is, terminal (meth)acryloyl groups contained in the side chain, and thus, an increase in the internal stress, leading to cause curling or cause interfacial peeling, may be generated in some cases. Existence of an excessive number of double bonds means that there are an excessive number of (meth)acryloyl groups on the terminals included in the side chain, in other words.

Taking the above-mentioned points into consideration, the double bond equivalent of the UV-curable urethane polymer is preferably 320 g/mol or more.

The upper limit of the double bond equivalent of the UV-curable urethane polymer is not particularly limited. However, if the double bond equivalent is excessively high, there is a possibility that failures such as insufficient crosslinking on the adhesive layer 18, leading to a generation of aggregation peeling on the layer, lowered hardness of the adhesive layer 18, deterioration of a function of protecting the inorganic layer 16, and easy generation of defects such as scratches would be generated. Having an excessively high double bond equivalent means that there is an excessively small number of terminal (meth)acryloyl groups included in the side chain.

Taking these points into consideration, the double bond equivalent of the UV-curable urethane polymer is preferably 1,500 g/mol or less, and more preferably 1,200 g/mol or less.

The double bond equivalent of the UV-curable urethane polymer may be measured by a known method.

Furthermore, as the double bond equivalent of the UV-curable urethane polymer, the numerical values described in the catalogues and the like may be used.

This point shall apply to a graft copolymer which becomes the binder of the light diffusion layer 20 which will be described later.

As such a UV-curable urethane polymer, for example, commercially available products such as UV Curable Urethane Polymer (ACRIT 8UH series) manufactured by Taisei Fine Chemical Co., Ltd. may be used.

Furthermore, a plurality of UV-curable urethane polymers may be used in combination.

The content of the UV-curable urethane polymer in the polymerizable composition for forming the adhesive layer 18 may be appropriately set, depending on the UV-curable urethane polymer to be used.

According to the studies of the present inventors, the content of the UV-curable urethane polymer is preferably 35% to 55% by mass, and more preferably 40% to 50% by mass, in the solid content of the polymerizable composition. The solid content of the polymerizable composition is a residual fraction after the volatile fractions of the polymerizable compositions have been volatilized.

It is preferable to set the content of the UV-curable urethane polymer to 35% by mass or more, for example, in views that aggregation peeling hardly occurs even when unpolymerized (meth)acryloyl groups are contained.

It is preferable to set the content of the UV-curable urethane polymer to 55% by mass or less, for example, in views that unpolymerized phosphoric acid compounds or silane coupling agents can be sufficiently held, thermally crosslinking materials can also be sufficiently added, and thus, the surface TAC during thermal curing can be suppressed.

The polymerizable composition for forming the adhesive layer 18 includes a curable urethane polyester (polyester urethane).

As the curable urethane polyester, any various known curable urethane polyesters can be used as long as they are thermally curable. In the following description, the "curable urethane polyester" is also referred to as a "urethane polyester".

Therefore, the weight-average molecular weight of the urethane polyester is not particularly limited, and may be appropriately set, depending on the type of the above-mentioned polyurethane.

According to the studies of the present inventors, the weight-average molecular weight of the urethane polyester is preferably 10,000 to 500,000, and more preferably 20,000 to 100.000.

It is preferable to set the weight-average molecular weight of the urethane polyester to 10,000 or more, for example, in views that evaporation of urethane polyesters by heating in the drying step is suppressed, and further, the viscosity of the coating film of the coating composition is improved to suppress failures such as cissing.

It is preferable to set the weight-average molecular weight of the urethane polyester to 500,000 or less, for example, from the viewpoints that the dilution amount (the amount of the dilution solvent) upon the regulation of the viscosity of the coating composition can be reduced, and thus, the coating amount can be lowered, or the pot life of the coating composition can be enhanced.

As the urethane polyester, various commercially available products can be used.

Specific examples thereof include VYLON UR series such as VYLON UR1400 manufactured by Toyobo Co., Ltd.

In addition, a plurality of urethane polyesters may be used in combination.

In the polymerizable composition for forming the adhesive layer 18, the content of the urethane polyester may be appropriately set, depending on the UV-curable urethane polymer, the urethane polyester, or the like to be used.

According to the studies of the present inventors, the content of the urethane polyester is preferably 10% to 20% by mass, and more preferably 12% to 17% by mass, in the solid content of the polymerizable composition.

It is preferable to set the content of the urethane polyester to 10% by mass or more, for example, in views that the adhesive layer 18 can be sufficiently cured or the mechanical strength of the adhesive layer 18 can be secured.

It is preferable to set the content of the urethane polymer to 20% by mass or less, for example, in views that the adhesiveness among the adhesive layer 18, the functional layers such as a quantum dot layer, and the inorganic layer 16 can be improved.

The polymerizable composition for forming the adhesive layer 18 further includes a phosphoric acid compound containing two or less (meth)acryloyl groups and/or a silane coupling agent containing one (meth)acryloyl group.

As the phosphoric acid compound containing two or less (meth)acryloyl groups, various known ones can be used. In the following description, the "phosphoric acid compound containing two or less (meth)acryloyl groups" is also referred to as a "phosphoric acid compound".

Specific examples of the phosphoric acid compound include bis[2-(methacryloyloxy)ethyl] and the following compound.

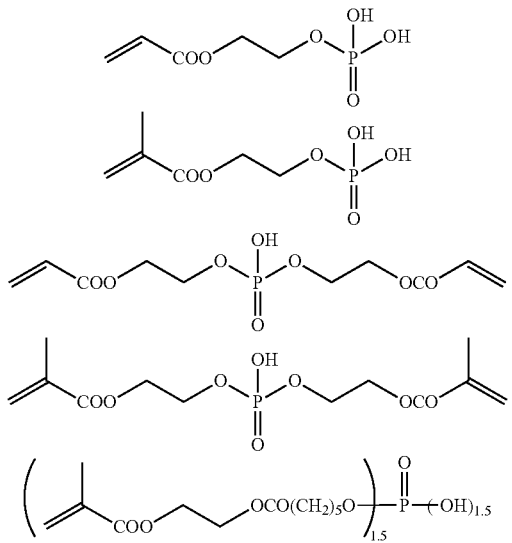

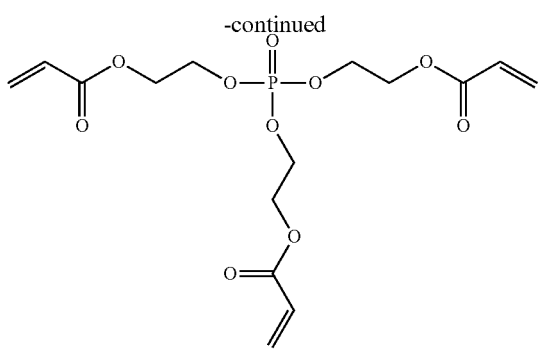

Furthermore, as the phosphoric acid compound, commercially available compounds such as KAYAMER series manufactured by Nippon Kayaku Co., Ltd., and Phosmer series manufactured by Uni-Chemical Co., Ltd. may be used.

Similarly, as the silane coupling agent containing one (meth)acryloyl group, various known ones can be used. In the following description, a "silane coupling agent containing one (meth)acryloyl group" is also referred to as a "silane coupling agent".

Specific examples of the silane coupling agent include 3-acryloxypropyl trimethoxysilane. Further, as the silane coupling agent, commercially available products such as KBM-5103, KBM-502, KBM-503, KBE-502, KBE-503, and the like manufactured by Shin-Etsu Silicone Co., Inc. can also be used. A plurality of the silane coupling agents may be used in combination.

As the phosphoric acid compound, those having a molecular weight of 200 to 400 is preferably used. As the silane coupling agent, those having a molecular weight of 200 to 300 are preferably used.

It is preferable to set the molecular weights of the phosphoric acid compound and the silane coupling agent to the above range, for example, in views that the phosphoric acid compound and/or the silane coupling agent can be suitably dispersed within a matrix formed by the UV-curable polyurethane and the urethane polyester.

In the polymerizable composition for forming the adhesive layer 18, the content of the phosphoric acid compound and/or the silane coupling agent may be appropriately set, depending on the UV-curable urethane polymer, the urethane polyester, or the like to be used.

According to the studies of the present inventors, the content of the phosphoric acid compound and/or the silane coupling agent is preferably 5% to 40% by mass, and more preferably 10% to 35% by mass in the solid content of the polymerizable composition.

It is preferable to set the content of the phosphoric acid compound and/or the silane coupling agent to 5% by mass or more, for example, in views that the adhesiveness between functional layers such as a quantum dot layer and the inorganic layer 16 can be improved.

It is preferable to set the content of the phosphoric acid compound and/or the silane coupling agent to 40% by mass or less, for example, in views that the adhesive layer 18 can be sufficiently cured or the blocking due to the bleeding into the back side of the support 12 at the time of winding with R-to-R or the like can be prevented.

Here, the adhesive layer 18 may use the phosphoric acid compound alone or the silane coupling agent alone, or may use a combination of the phosphoric acid compound and the silane coupling agent.

For example, in a case where the inorganic layer 16 is silicon nitride, use of the silane coupling agent alone can enhance the adhesiveness between the inorganic layer 16 and the adhesive layer 18. Further, in a case where the inorganic layer 16 is aluminum oxide, use of the phosphoric acid compound alone can enhance the adhesiveness between the inorganic layer 16 and the adhesive layer 18. Accordingly, selection of either the phosphoric acid compound or the silane coupling agent may be performed, depending on the forming materials of the inorganic layer 16 in the underlayer.

Here, the gas barrier film 10 of the present invention is used in, for example, applications in which a functional layer such as a quantum dot layer is sandwiched between two gas barrier films to prevent deterioration of the functional layer due to moisture, oxygen, or the like. At this time, the gas barrier film 10 is disposed such that the adhesive layer 18 faces the quantum dot layer or the like. Further, by way of an example, the functional layer is configured to be formed by dispersing functional materials such as quantum dots in a binder.

In a case where the adhesive layer 18 contains a phosphoric acid compound, depending on the binder of the functional layer to be sandwiched, higher adhesiveness may be obtained in some cases, and in a case where the adhesive layer 18 contains a silane coupling agent, higher adhesiveness may be obtained in some cases. Accordingly, it is preferable to incorporate both the phosphoric acid compound and the silane coupling agent into the adhesive layer 18, in views that good adhesiveness can be obtained with respect to the functional layers using various binders.

The adhesive layer 18 preferably contains a photopolymerization initiator.

As will be described later, the wavelength conversion film of the present invention is preferably formed by preparing the gas barrier film 10 and another gas barrier film, for example, applying a polymerizable composition containing quantum dots onto the adhesive layer 18 of the gas barrier film 10, and then laminating the other gas barrier film thereon, facing the polymerizable composition, and curing the polymerizable composition by performing drying and irradiation with ultraviolet rays. Further, it is thought that the gas barrier film 10 of the present invention may be used in a functional laminated film which is manufactured in the same manner, in addition to the wavelength conversion film, in many cases.

During the curing by the irradiation with ultraviolet rays, the UV-curable urethane polymer having a (meth)acryloyl group, the phosphoric acid compound, and the silane coupling agent, included in the adhesive layer 18, are cross-linked. At this time, by incorporation of the photopolymerization initiator into the adhesive layer 18, the crosslinking within this adhesive layer 18 more suitably proceeds, and thus, the adhesiveness among the functional layer, the inorganic layer 16, and the adhesive layer 18 can be improved. In addition, the dose of ultraviolet rays to be irradiated during the formation of the functional layers such as a quantum dot layer can also be reduced.

As the photopolymerization initiator, various known ones can be used. Specific suitable examples thereof include commercially available products such as IRGACURE series (for example, IRGACURE 651, IRGACURE 754, IRGACURE 184, IRGACURE 2959, IRGACURE 907, IRGACURE 369, IRGACURE 379, and IRGACURE 819) commercially available from BASF, DAROCUR series (for example, DAROCURE TPO and DAROCURE 1173), QUANTACURE PDO, and ESACURE series (for example, ESACURE TZM, ESACURE TZT, and ESACURE KT046) commercially available from Lamberti SpA.

In addition, the amount of the photopolymerization initiator to be added may be appropriately set, depending on the photopolymerization initiator to be used, and the like, and is preferably 0.5% to 4% by mass, and more preferably 1% to 3% by mass, in the solid content of the polymerizable composition.

The adhesive layer 18 preferably contains a lubricant.

As described above, the gas barrier film 10 of the present invention can suitably correspond to production by R-to-R as well as the production of a functional laminated film such as a wavelength conversion film by R-to-R.

Here, as will be described in detail later, since the adhesive layer 18 is formed by a coating method, it has a very high surface smoothness. As a result, depending on the forming materials of the adhesive layer 18, the films are adhered to each other during the winding, and unwinding may not be smoothly carried out in some cases.

In contrast, by incorporation of the lubricant into the adhesive layer 18, it is possible to stably facilitate winding or unwinding, when corresponding to R-to-R.

As the lubricant, various known lubricants (matting agents) such as oleic acid amide and silicon oxide particles can be used. Among those, silicon particles are suitably used. Among those, silicon particles having a particle diameter of approximately 5 to 30 nm are suitably used. These silicon particles have an effect of imparting very high lubricating properties with the addition of a small amount of the particles, which are thus preferable.

The amount of the lubricant to be added may be appropriately set, depending on the lubricants. For example, with the silicon particles having a particle diameter of approximately 5 to 30 nm, the amount of the silicon particles may be set to approximately 0.0005 to 0.005 $g/m^2$, and preferably approximately 0.001 $g/m^2$, depending on the desired thickness of the adhesive layer.

Furthermore, the components such as the UV-curable urethane polymer, the curable urethane polyester, the phosphoric acid compound, and the silane coupling agent, which become the forming materials of the adhesive layer 18, can be detected by analyzing the adhesive layer 18 and interpreting the analysis results by known methods.

This point also applies to the light diffusion layer 20 which will be described later.

The thickness of the adhesive layer 18 may be appropriately set, depending on the forming materials of the adhesive layer 18, the thickness or the size of the gas barrier film 10, the applications of the gas barrier film, or the like.

According to the studies of the present inventors, the thickness of the adhesive layer 18 is preferably 10 to 1,000 nm, more preferably 50 to 700 nm, and particularly preferably 70 to 500 nm.

It is preferable to set the thickness of the adhesive layer 18 to 10 nm or more, for example, in views that the inorganic layer 16 can be suitably protected.

It is preferable to set the thickness of the adhesive layer 18 to 1,000 nm or less, for example, in views that the gas barrier film 10 can be prevented from being unnecessarily thickened or maintain a low internal stress to realize high adhesiveness.

Such an adhesive layer 18 may be formed by a known method for forming a layer formed of organic compounds, depending on the forming materials of the adhesive layer 18, or the like.

By way of an example, the adhesive layer 18 may be formed by a coating method.

That is, first, a coating composition (polymerizable composition) which includes an organic solvent, and the UV-curable urethane polymer, the urethane polyester, and the phosphoric acid compound, and/or the silane coupling agent as described above, or further including a photopolymerization initiator and/or a lubricant, is prepared. To this coating composition, a thermal polymerization initiator and the like may be added, if desired.

Subsequently, this coating composition is applied onto the surface of the inorganic layer 16, and the coating composition is heated and dried. Coating and heating may be carried out by known methods.

When heating and drying the coating composition, the main chain of the UV-curable urethane polymer and the urethane polyester are crosslinked and cured, and the sufficiently cured adhesive layer 18, in which a phosphoric acid compound and/or a silane coupling agent, containing an uncrosslinked (meth)acryloyl group, is dispersed in a matrix formed by the main chain of the UV-curable urethane polymer and the urethane polyester, by the UV-curable urethane polymers with each other, and by the urethane polyesters with each other, as described above, is formed. Further, by this heating, the hydrogen bonding or the covalent bonding between the phosphoric acid compound and/or the silane coupling agent, and the —OH group on the surface of the inorganic layer 16 proceeds, and thus, the inorganic layer 16 is adhered to the adhesive layer 18 with high adhesive force. In addition, by this heating, the hydrolysis of the silane coupling agent also proceeds.

The drying temperature of the coating composition which forms the adhesive layer 18 may be appropriately set, depending on the components of the coating composition, or the like.

According to the studies of the present inventors, the drying temperature of the coating composition is preferably 90° C. to 150° C. It is preferable to set the drying temperature of the coating composition to the above range, for example, in views that the curing of the main chain of the UV-curable urethane polymer and the urethane polyester can sufficiently proceed, deterioration of the components contained in the coating composition can be prevented, or deterioration of the support 12 can be prevented.

Furthermore, if desired, after drying the coating composition, a heating step for sufficiently curing the main chain of the UV-curable urethane polymer and the urethane polyester may be carried out. The heating temperature in the heating step may be set in the same manner as the drying of the coating composition.

The formation of such the adhesive layer 18 is also preferably carried out by R-to-R.

Furthermore, the adhesive layer 18 is not limited to the above configuration in which the adhesive layer 18 is formed using the UV-curable urethane polymer and the like, and has a hardness which makes it possible to protect the inorganic layer 16. Further, organic layers using various organic compounds can be used as long as sufficient adhesiveness to the functional layers such as a quantum dot layer can be secured.

In the gas barrier film 10, the light diffusion layer 20 is formed on the surface opposite to the surface of the support 12, on which the underlying organic layer 14, the inorganic layer 16, and the adhesive layer 18 are formed. Incorporation of the light diffusion layer 20 leads to an increase in the dose of excitation light incident to the quantum dot layer or the dose of light emitted from the quantum dot layer in the quantum dot film which will be described later, and thus, the brightness of an LCD or the like can be improved.

The light diffusion layer 20 is formed by dispersing light diffusing agents in a binder formed using a graft copolymer having a molecular weight of 10,000 to 3,000,000 and a double bond equivalent of 500 g/mol or more, which has an acrylic polymer as the main chain and at least one of a urethane polymer with an acryloyl group at a terminal or a urethane oligomer with an acryloyl group at a terminal in the side chain.

In the binder of the light diffusion layer 20 formed of such the graft copolymer, the urethane polymer and/or the urethane oligomer in the side chain is crosslinked by curing, and preferably by thermal curing.

In addition, the acryloyl group at a terminal of the urethane polymer and/or the urethane oligomer in the side chain remains uncrosslinked.

As a result, the light diffusion layer 20 has the surface in the cured state. Accordingly, the gas barrier film 10 of the present invention, which further has such light diffusion layer 20 or adhesive layer 18, has good handleability and can be wound, and thus it can also be suitably used in R-to-R.

Moreover, the acryloyl group at a terminal of the urethane polymer and/or the urethane oligomer in the side chain of the graft copolymer preferably remains uncrosslinked. In this case, in a similar manner to the above-mentioned adhesive layer 18, the acryloyl groups at the terminals of the urethane polymer and/or the urethane oligomer in the side chain of the graft copolymer are crosslinked by the irradiation with ultraviolet rays, or the like for curing the functional layer during the formation of functional layers such as a quantum dot layer on the adhesive layer 18 of the gas barrier film 10, thereby completing the curing.

As a result, by the gas barrier film 10 of the present invention, the adhesive layer 18 and the light diffusion layer 20 have such hardness that may provide good handleability by thermal curing or the like even when the ultraviolet-curable adhesive layer 18 and the light diffusion layer 20, and then the light diffusion layer 20 or the adhesive layer 18 can further be completed only with a one-time irradiation with ultraviolet rays in the production of a quantum dot film or the like. Thus, yellowing of the light diffusion layer 20, caused by the irradiation with ultraviolet rays, can be prevented, and the gas barrier film 10 including the light diffusion layer 20 having good transparency and good optical characteristics is obtained.

Furthermore, since the light diffusion layer 20 is completed by ultraviolet curing, the crosslinkability is high and sufficient scratch resistance of final products can also be obtained.

In addition, it is the same as described above that the adhesive layer 18, the quantum dot layer, and the inorganic layer 16 have sufficient adhesive forces with each other.

As described above, the binder of the light diffusion layer 20 is formed by curing a graft copolymer having a molecular weight of 10,000 to 3,000,000 and a double bond equivalent of 500 g/mol or more, which has an acrylic polymer as the main chain and at least one of a urethane polymer with an acryloyl group at a terminal or a urethane oligomer with an acryloyl group at a terminal in the side chain.

This graft copolymer may be any of the copolymers having a structure in which urethane monomer units are arranged as the side chain in some parts of the monomer units of the acryl main chain which becomes a stem, and generally, are only required to have a structure formed by graft copolymerization.

Such a graft copolymer has high transparency and is difficult to be yellowed. Further, the light diffusion layer 20 having a low refractive index and good light diffusibility can be formed.

The acryl main chain of the graft copolymer may be formed by the polymerization of each of (meth)acrylate monomers, ethyl acrylate monomers, or the like, or may be a copolymer of any one of these monomers, or a copolymer of any one of these monomers with other monomers. For example, it is also preferably a copolymer obtained from (meth)acrylic acid ester and ethylene.

At least a part of the side chain bonded to the acryl main chain is a side chain including a urethane polymer unit or a urethane oligomer unit. The graft copolymer may have a plurality of each of the urethane polymer units having different molecular weights and the urethane oligomer units having different molecular weights. The molecular weight of the urethane polymer unit may be, for example, any value in a range of 3,000 to 4,000. Further, the molecular weight of the urethane oligomer unit may be, for example, any value in a range of 350 to 600. The graft copolymer may have both of a side chain including the urethane polymer units and a side chain including the urethane oligomer units.

The acryl main chain may be bonded to the urethane polymer unit or the urethane oligomer unit directly or via another linking group. Examples of such other linking group include an ethylene oxide group, a polyethylene oxide group, a propylene oxide group, and a polypropylene oxide group. The graft copolymer may include plural kinds of side chains in which the urethane polymer units or the urethane oligomer units are bonded via another linking group (including direct bonding).

At least a portion of the side chain including the urethane polymer unit or the urethane oligomer unit has a (meth)acryl group at a terminal. Preferably, any of the side chains including the urethane polymer unit or the urethane oligomer unit in the graft copolymer has a (meth)acryl group at a terminal. The terminal (meth)acryl group is preferably an acryl group.

The graft copolymer may have other side chains, in addition to the side chain including the urethane polymer unit or the urethane oligomer unit. Examples of such other side chains include a linear or branched alkyl group. The linear or branched alkyl group is preferably a linear alkyl group having 1 to 6 carbon atoms, more preferably an n-propyl group, an ethyl group, or a methyl group, and still more preferably a methyl group.

The graft copolymer may have a structure including a plurality of different side chains and a plurality of respective different side chains as described above in terms of the molecular weight of the urethane polymer unit, the urethane oligomer unit, the linking group, or the like.

The graft copolymer which becomes the binder of the light diffusion layer 20 has a molecular weight of 10,000 to 300,000.

When the molecular weight of the graft copolymer is less than 10,000, the graft copolymer evaporates depending on the drying temperature in the falling-rate drying state of the polymerizable composition (coating composition) which forms the light diffusion layer 20, and failures such as a difficulty in forming the light diffusion layer 20 having a desired thickness, a lowered viscosity of the polymerizable composition, and a difficulty in controlling the flow of the light diffusing agents are generated.

When the molecular weight of the graft copolymer is more than 300,000, problems may occur in that, for example, the viscosity of the polymerizable composition becomes higher, it is difficult to regulate the dilution ratio of the polymerizable composition, and the amount of solvent to be dried becomes larger, leading to an increased drying load, which makes controlling more difficult.

Taking the above-mentioned points into consideration, the molecular weight of the graft copolymer is preferably 10,000 to 2,500,000, and more preferably 12,000 to 200,000.

Furthermore, the graft copolymer which becomes the binder of the light diffusion layer 20 has a double bond equivalent (acryl equivalent) of 500 g/mol or more.

When the double bond equivalent of the graft copolymer is less than 500 g/mol, curls become stronger due to curing and shrinkage, and in a case where the support 12 is thin, failures such as an occurrence of a problem caused by deformation are generated.

Taking the above-mentioned points into consideration, the double bond equivalent of the graft copolymer is preferably 550 g/mol or more, and more preferably 600 g/mol or more.

The upper limit of the double bond equivalent of the graft copolymer is not particularly limited. However, if the double bond equivalent is excessively large, there is a possibility that failures such as easy generation of defects caused by the hardness of the light diffusion layer 20, such as deterioration of scratch resistance due to insufficient curing, are generated. Having an excessively high double bond equivalent means that there is an excessively small number of terminal (meth)acryloyl groups included in the side chain.

Taking these points into consideration, the double bond equivalent of the graft copolymer is more preferably 2,000 g/mol or less.

As such a graft copolymer, commercially available products such as UV Curable Urethane Acrylic Polymer (ACRIT 8BR series) may be used.

In addition, a plurality of the graft copolymers may be used in combination.

For the light diffusion layer 20, various curable monomers, dimers, trimers, oligomers, polymers, and the like may be used in combination with graft copolymers such as a curable acrylic polymer, a curable urethane acrylate, and a curable urethane polymer in the binder, for the purpose of regulating the refractive index of the binder, and the like.

For these, various curable monomers or polymers can be used. Further, various commercially available products can also be used. Examples thereof include ACRIT 8UX-015A (ultraviolet-curable urethane acrylate) and ACRIT 8DKseries (ultraviolet-curable acrylic polymer), both manufactured by Taisei Fine Chemical Co., Ltd.

In addition, in the light diffusion layer 20, such curable monomers, polymers, and the like preferably account for 90% by mass or less, and more preferably 85% by mass or less of the binder.

The light diffusion layer 20 is formed by dispersing light diffusing agents in a binder formed of such a graft copolymer.

As the light diffusing agent, known light diffusing agents (light scattering particles) can be used as long as they have different refractive indices from that of the binder.

Accordingly, the light diffusing agents may be either organic particles or inorganic particles, or may be organic and inorganic composite particles. For example, as the organic particles, synthesis resin particles can be used. Specific examples thereof include silicone resin particles, (meth)acrylic resin particles such as polymethyl methacrylate (PMMA), nylon resin particles, styrene resin particles, polyethylene particles, urethane resin particles, and benzoguanamine particles.

From the viewpoint of ready availability of the particles having a suitable refractive indices, silicone resin particles and acrylic resin particles are preferable. Among those, from the viewpoint of a low refractive index, good adhesiveness to a graft copolymer which becomes a binder, and the like, silicone resin particles are suitably used.

Furthermore, for the light diffusing agents, particles having a hollow structure can also be used.

As the light diffusing agents, commercially available products can also be suitably used.

Examples thereof include TOSPEARL series of silicone resin particles, manufactured by Momentive Performance Materials Inc.

The particle diameter of the light diffusing agent is not particularly limited, but may be appropriately set, depending on the refractive index of the light diffusing agent, the difference in the refractive indices between the light diffusing agent and the binder, and the like.

According to the studies of the present inventors, the particle diameter of the light diffusing agent is preferably 0.5 μm or more, more preferably 0.5 to 30 μm, and still more preferably 2 to 20 μm.

It is preferable to set the particle diameter of the light diffusing agent to 0.5 μm or more, for example, in views that a good light diffusion effect is obtained.

Furthermore, two kinds of light diffusing agents having different particle diameters (sizes) may be used. It is preferable to use two kinds of light diffusing agents having different particle diameters, for example, in views that the brightness of the light irradiated from the quantum dot film can be improved or the distribution of the brightness for the viewing angle when being used in an LCD or the like can be regulated by controlling the ratio of internal scattering to external scattering.

Here, in a case of using two kinds of light diffusing agents having different particle diameters, the particle diameter of the smaller light diffusing agent is preferably 1 to 5 μm, and more preferably 1.5 to 4 μm, from the viewpoint of imparting internal scattering properties. Further, the particle diameter of the larger light diffusing agent is preferably 8 to 15 μm, and more preferably 9 to 12 μm, from the viewpoints of imparting external scattering properties and imparting anti-Newton ring properties.

In a case of using two kinds of light diffusing agents having different particle diameters, "the mass of the small-diameter particles/the mass of the large-diameter particles" which is the ratio of the total mass of the smaller light diffusing agents to the total mass of the larger light diffusing agents, in the light diffusion layer 20, is preferably 0.67 to 1.5, and more preferably 0.8 to 1.2.

It is preferable to set "the mass of the small-diameter particles/the mass of the large-diameter particles" to 0.67 or more, for example, in views that a contribution to internal scattering is increased, and thus the inside haze can be increased and scattering properties can also be increased.

It is preferable to set "the mass of the small-diameter particles/the mass of the large-diameter particles" to 1.5 or less, for example, in views that it is possible to control the extension width in the viewing angle of brightness (excessive diffusion can be prevented) by obtaining external scattering while maintaining the inside haze, and further, irregularities of the surface are sufficiently formed, which can prevent blocking or generation of Newton rings.

In the light diffusion layer 20, basically, the refractive index n1 of the binder and the refractive index n2 of the light diffusing agent may be any value satisfying n1>n2. Further, the refractive index of the binder is a refractive index after the crosslinking of the terminal acryloyl groups, which is specifically a refractive index in a state where the layer becomes a functional laminated film such as a wavelength conversion film (quantum dot film).

Here, according to the studies of the present inventors, the quantum difference, "n1−n2", between the refractive index n1 of the binder and the refractive index n2 of the light diffusing agent, is preferably 0.02 to 0.07, and "n1−n2" is more preferably 0.03 to 0.06. Further, the refractive index n1 of the binder is preferably 1.5 or less, and more preferably 1.48 or less.

It is preferable to set the "difference, n1−n2, between the refractive index n1 of the binder and the refractive index n2 of the light diffusing agent" to 0.02 or more, for example, in views that good light diffusibility is obtained.

It is preferable to set the difference "n1−n2" to 0.07 or less, for example, in views that the scattering intensity in the viewing angle can be controlled.

Furthermore, it is preferable to set the refractive index n1 of the binder to 1.5 or less, for example, in views that the reflection rate of the light diffusion layer 20 is reduced and the transmittance is increased, which can improve the extraction efficiency of light.

Furthermore, the particle diameter of the light diffusing agent may be determined by, for example, an observation using a scanning electron microscope (SEM). Specifically, the cross-sectional surface of the light diffusion layer 20 is imaged at a magnification of 5,000, and then a primary particle diameter is measured from the obtained image. Further, for the particles that are not in spheric shapes, an average value of the length of the long axis and the length of the short axis is determined, and the value is adopted as a primary particle diameter. The primary particle diameter thus determined, is taken as the particle size of the particle above. Furthermore, the particle size shown in Examples which will be described later is a value measured using S-3400N manufactured by Hitachi High-Technologies Corp. as a scanning electron microscope.

Furthermore, the refractive indices of the binder and the light diffusing agent can be measured by a known refractive index measurement device. Examples of the refractive index measurement device include Multi-Wavelength Abbe Refractometer DR-M2 manufactured by Atago Co., Ltd.

As the particle diameter and the refractive index, the numerical values described in the catalogues and the like may be used.

In the light diffusion layer 20, "the mass of the binders/the mass of the light diffusing agents" which is the ratio of the total mass of the binders to the total mass of the light diffusing agents is preferably 0.1 to 0.8, and more preferably 0.25 to 0.66. That is, in the gas barrier film 10 of the present invention, it is preferable that the light diffusion layer 20 has more light diffusing agents than the binders in terms of the mass ratio.

It is preferable to set "the mass of the binders/the mass of the light diffusing agents" to 0.1 or more, for example, in views that the strength of the light diffusion layer 20 can be improved, or the aggregation peeling in the light diffusion layer 20 can be prevented.

It is preferable to set "the mass of the binder/the mass of the light diffusing agent" to 0.8 or less, for example, in views that good light diffusion performance is obtained.

As the thickness of the light diffusion layer 20, a thickness for obtaining a desired light diffusion performance or strength of the light diffusion layer may be appropriately set, depending on the forming materials of the binder, the type of the light diffusing agent, or the like.

According to the studies of the present inventors, the thickness of the light diffusion layer 20 is preferably set to 5 to 25 μm, more preferably 7 to 20 μm, and particularly preferably 9 to 18 μm.

It is preferable to set the thickness of the light diffusion layer 20 to 5 μm or more, for example, in views that good light diffusion performance is obtained.

Further, it is preferable to set the thickness of the light diffusion layer to 20 to 25 μm or less, for example, in views that the gas barrier film 10 is prevented from being unnecessarily thick, the light diffusion layer 20 having high light transmittance is obtained, or curling can be suppressed.

Such a light diffusion layer 20 may be formed by a known method for forming a layer formed of organic compounds, depending on the binder of the light diffusion layer 20, and the like.

By way of an example, the light diffusion layer 20 may be formed by a coating method. That is, first, a coating composition (polymerizable composition) including an organic solvent, the graft copolymer as described above, and light diffusing agents is prepared. To this coating composition, if desired, a thermal polymerization initiator, a surfactant, a dispersant, and the like may be added. Further, in the same manner as above, two kinds of light diffusing agents having different particle diameters may be used.

Subsequently, this coating composition is applied onto the surface opposite to the surface on which the inorganic layer 16 of the support 12 is formed, and the coating composition is heated and dried. Coating and heating may be carried out by a known method.

When heating and drying the coating composition, the urethane polymers and/or urethane oligomers having acryloyl groups at the terminals of the side chain are crosslinked and cured, and a sufficiently cured light diffusion layer 20 is obtained. Further, in this state, the acryloyl groups at the terminals of the side chain are in the uncrosslinked state, but in the same manner as described above, the acryloyl groups at the terminals of the side chain for forming the quantum dot layer which will be described later are cured by irradiation with ultraviolet rays, and curing of the light diffusion layer 20 is completed.

The drying temperature of the coating composition which forms the light diffusion layer 20 may be appropriately set, depending on the components of the coating composition, and the like.

Here, it is not preferable that drying during the formation of the light diffusion layer 20 is carried out by excessive heating. That is, as described above, the curing of the binder with ultraviolet rays is a separate step from the step of forming the quantum dot layer, and the like. Therefore, if only urethane is in the thermally crosslinked state with increased internal stress while the acryloyl groups are in the uncrosslinked state, local aggregation peeling in the acryloyl groups is caused, and thus, there is a possibility that failures such as dusting (particles are released or scraped) are generated. That is, it is preferable that the coating composition for forming the light diffusion layer 20 is dried such that the solvent of the coating composition is sufficiently evaporated and heat is not excessively performed.

Taking these points into consideration, the drying temperature of the coating composition for forming the light diffusion layer 20 is preferably 40° C. to 130° C., and more preferably 50° C. to 110° C. It is preferable to set the drying temperature of the coating composition to the above range, for example, in views that the curing of the graft copolymer appropriately proceeds, and thus, generation of dusting and the like can be prevented.

In addition, if desired, a heating step for sufficiently performing the thermal curing of the graft copolymer may be carried out after drying the coating composition. The heating temperature in the heating step may be set to the same temperature as that for drying the coating composition.

In the production of the gas barrier film 10 of the present invention, it is preferable that the light diffusion layer 20 is formed after the underlying organic layer 14, the inorganic layer 16, and the adhesive layer 18 are formed.

The light diffusion layer 20 is also preferably formed using R-to-R. Here, the light diffusion layer 20 is thicker than the underlying organic layer 14, the inorganic layer 16, and the adhesive layer 18. As a result, when the light diffusion layer 20 is initially formed, the support 12 that can be wound onto the roller becomes shorter, which is thus disadvantageous in productivity.

Moreover, as described above, the inorganic layer 16 is formed by a vapor-phase film forming method such as plasma CVD. When film formation using R-to-R is performed, it is preferable that a substrate is wound around a cylindrical drum and then transported, in view of the stability of the substrate during the film formation. Here, the light diffusion layer 20 is formed by dispersing particles in a binder, and has a low surface smoothness. As a result, when the light diffusion layer 20 is first formed, the adhesiveness between the drum and the support 12 may be deteriorated, and thus, the film formation of the inorganic layer 16 may become unstable in some cases. Further, if the light diffusion layer 20 is first formed, the control thereof becomes difficult even in a case of regulating the temperature of the deposition surface of the inorganic layer 16 by heating or cooling the drum.

FIG. 2 conceptually shows an example of the wavelength conversion film of the present invention, using such gas barrier film 10 of the present invention.

Furthermore, the wavelength conversion film 30 shown in FIG. 2 is a functional laminated film formed by sandwiching a quantum dot layer 32 as a functional layer between the gas barrier film 10 and the gas barrier film 34 of the present invention, in which the gas barrier film 10 (functional composite film) of the present invention can be used in various functional laminated films, in addition to the wavelength conversion film.

Examples thereof include a functional laminated film having an organic electroluminescent layer (organic EL layer) and the like as the functional layer.

The wavelength conversion film 30 is a so-called quantum dot film, which is formed by sandwiching the quantum dot layer 32 between the gas barrier film 10 and the gas barrier film 34 shown in FIG. 1, facing the adhesive layer 18. In other words, the wavelength conversion film 30 is formed by sandwiching the quantum dot layer 32 between the two gas barrier films facing the adhesive layer 18. In addition, the gas barrier film 34 basically has the same configuration as the gas barrier film 10 of the present invention, except that the gas barrier film 34 does not have the light diffusion layer 20.

The quantum dot layer 32 is formed by dispersing quantum dots in a binder (matrix) such as a resin. The quantum dot layer 32 has a function of converting the wavelength of the incident ray to emit the light.

For example, when blue light emitted from a backlight not shown is incident on the quantum dot layer 32, the quantum dot layer 32 coverts the wavelength of at least a part of the blue light into red light or green light by the effect of the quantum dot contained inside to emit the light.

The blue light is light having a central light emission wavelength in a wavelength range of 400 nm to 500 nm, the green light is light having a central light emission wavelength in a wavelength range of 500 nm to 600 nm, and the red light is light having a central light emission wavelength in a wavelength range of more than 600 nm to 680 nm or less.

In addition, the function of the wavelength conversion expressed by the quantum dot layer is not limited to a configuration for the wavelength conversion from blue light to red light or green light, and may be any of functions that convert at least a part of incidence ray into light having a different wavelength.

The quantum dot is at least excited by incident excitation light to emit fluorescent light.

The type of the quantum dot contained in the quantum dot layer is not particularly limited, and various known quantum dots may be appropriately selected, depending on desired performance of wavelength conversion, and the like.

With regard to the quantum dots (quantum dot materials), reference can be made to, for example, paragraph Nos. [0060] to [0066] of JP2012-169271A, but the quantum dots are not limited thereto. Further, as the quantum dot, a commercialized product can be used without any limitation. The light emission wavelength of the quantum dots can be typically regulated by the composition or the size of a particle.

The quantum dots may be used singly or in combination of two or more kinds thereof.

In a case of using the quantum dots in combination of two or more kinds thereof, two or more kinds of quantum dots having different wavelengths of the emitted light may be used.

Specifically, examples of known quantum dots include a quantum dot (A) having a center light emission wavelength in the wavelength range in a range of 600 nm to 680 nm, a quantum dot (B) having a center light emission wavelength in the wavelength range in a range of 500 nm to 600 nm, and a quantum dot (C) having a center light emission wavelength in the wavelength range in a range of 400 nm to 500 nm, and the quantum dot (A) is excited by excitation light to emit red light, the quantum dot (B) is excited by excitation light to emit green light and the quantum dot (C) is excited by excitation light to emit blue light. For example, when blue light is incident as excitation light on a quantum dot-containing laminate including the quantum dot (A) and the quantum dot (B), red light emitted from the quantum dot (A), green light emitted from the quantum dot (B) and blue light penetrating through the quantum dot layer can realize white light. Alternatively, ultraviolet light can be incident as excitation light on a quantum dot layer including the quantum dots (A), (B), and (C), thereby making it possible to realize white light with red light emitted from the quantum dot (A), green light emitted from the quantum dot (B) and blue light emitted from the quantum dot (C).

Moreover, as the quantum dot, a so-called quantum rod which emits polarized light with directivity in a rod shape may be used.

The quantum dots are preferably dispersed uniformly in the binder, but may be unevenly dispersed in the binder.

The type of the binder of the quantum dot layer 32 is not particularly limited, but various resins that are used as known quantum dot layers can be used.

Examples thereof include polyester-based resins (for example, polyethylene terephthalate and polyethylene naphthalate), (meth)acrylic resins, polyvinyl chloride-based resins, and polyvinyl chloride-based resins.

Alternatively, as the binder, those formed by curing (polymerizing/crosslinking) a curable compound (polymerizable compound (polymerizable monomer)) having one or more polymerizable groups (crosslinkable groups) can be used. In addition, the polymerizable groups of the curable compound substances having two or more polymerizable groups may be the same as or different from each other.

The type of the polymerizable group is not particularly limited, but the polymerizable group is preferably a (meth)acryloyl group, a vinyl group, or an epoxy group, more preferably a (meth)acryloyl group, and still more preferably an acryloyl group. That is, in the present invention, the binder of the quantum dot layer is preferably a (meth)acrylic resin, and more preferably an acrylic resin.

As described above, in the gas barrier film 10 of the present invention, the adhesive layer 18 includes a urethane polymer containing an uncrosslinked (meth)acryloyl group, a phosphoric acid compound and/or a silane coupling agent.

Accordingly, by forming the quantum dot layer 32 by curing a curable compound containing a (meth)acryloyl group as the polymerizable group, the (meth)acryloyl group in the quantum dot layer 32 and the (meth)acryloyl group in the adhesive layer 18 are suitably reacted with each other and crosslinked during the curing of the quantum dot layer 32, and thus, the adhesiveness between the adhesive layer 18 and the quantum dot layer 32 can be improved.

Moreover, the curable compound which forms the quantum dot layer 32 preferably has a molecular weight of 500 or less.

It is preferable to form the quantum dot layer 32, using the curable compound having a molecular weight of 500 or less, for example, in views that the curable compound easily enters the matrix structure in the above-mentioned adhesive layer 18, and thus, the adhesiveness between the adhesive layer 18 and the quantum dot layer 32 can be improved.

In the quantum dot layer 32, specifically, for example, a resin formed by curing a curable composition including a first curable compound and a second curable compound, which will be described below, can be used as the binder.

The first curable compound is preferably one or more compounds selected from bifunctional or higher (meth)acrylate monomers and monomers having two or more functional groups selected from the group consisting of an epoxy group and an oxetanyl group.

Preferred examples of the bifunctional (meth)acrylate monomers among the bifunctional or higher (meth)acrylate monomers include neopentyl glycol di(meth)acrylate, 1,9-nonanediol di(meth)acrylate, tripropylene glycol di(meth)acrylate, ethylene glycol di(meth)acrylate, tetraethylene glycol di(meth)acrylate, hydroxypivalic acid neopentyl glycol di(meth)acrylate, polyethylene glycol di(meth)acrylate, dicyclopentenyl (meth)acrylate, dicyclopentenyloxyethyl (meth)acrylate, and dicyclopentanyl di(meth)acrylate.

Furthermore, preferred examples of the trifunctional or higher (meth)acrylate monomers among the bifunctional or higher (meth)acrylate monomers include ECH-modified glycerol tri(meth)acrylate. EO-modified glycerol tri(meth)acrylate, PO-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritolethoxy tetra(meth)acrylate, and pentaerythritol tetra(meth)acrylate.

As the monomer having two or more functional groups selected from the group consisting of an epoxy group and an oxetanyl group, for example, aliphatic cyclic epoxy compound, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, hydrogenated bisphenol A diglycidyl ether, hydrogenated bisphenol F diglycidyl ether, hydrogenated bisphenol S diglycidyl ether, 1,4-butanediol diglycidyl ether, 1,6-hexanediol diglycidyl ether, glycerin triglycidyl ether, trimethylolpropane triglycidyl ether, polyethylene glycol diglycidyl ether, and polypropylene glycol diglycidyl ethers; polyglycidyl ethers of polyetherpolyols obtained by adding one kind or two or more kinds of alkylene oxides to aliphatic polyhydric alcohols such as ethylene glycol, propylene glycol, and glycerin; diglycidyl esters of aliphatic long-chain dibasic acids; glycidyl esters of higher fatty acids; and compounds including epoxycycloalkane are suitably used.

Examples of commercially available products which can be suitably used as the monomer having two or more functional groups selected from the group consisting of an epoxy group and an oxetanyl group include CELLOXIDE 2021 P and CELLOXIDE 8000, both manufactured by Daicel Corporation, and 4-Vinylcyclohexene Dioxide manufactured by Sigma Aldrich. These can be used singly or in combination of two or more kinds thereof.

Furthermore, a method for producing the monomer having two or more functional groups selected from the group consisting of an epoxy group and an oxetanyl group is not limited, but can be synthesized with reference to, for example, 20 Organic Synthesis 11 in Experimental Chemistry Series 4$^{th}$ ed., 213~, 1992, Japan Chemical Society Ed., Maruzen Publ. Co., Ed. by Alfred Hasfner, The chemistry of heterocyclic compounds-Small Ring Heterocycles part 3 Oxiranes, John & Wiley and Sons, An Interscience Publication, New York, 1985, Yosimura, Adhesion, Vol. 29, No. 12, 32, 1985, Yoshimura, Adhesion. Vol. 30, No. 5, 42, 1986, Yoshimura. Adhesion, Vol. 30, No. 7, 42, 1986, JP1999-100378A (JP-H11-100378A), JP2906245B, JP2926262B, and the like.

The second curable compound has a functional group having hydrogen bonding properties in the molecule, and a polymerizable group capable of performing a polymerization reaction with the first curable compound.

Examples of the functional group having hydrogen bonding properties in the molecule include a urethane group, a urea group, and a hydroxyl group.

The polymerizable group capable of performing a polymerization reaction with the first curable compound may be a (meth)acryloyl group, for example, in a case where the first curable compound is a bifunctional or higher (meth)acrylate monomer. Further, the polymerizable group capable of performing a polymerization reaction with the first curable compound may be an epoxy group or an oxetanyl group when the first curable compound is the monomer having two or more functional groups selected from the group consisting of an epoxy group and an oxetanyl group.

The (meth)acrylate monomer containing a urethane group is a monomer or oligomer obtained by reacting a diisocyanate such as TDI, MDI, HDI, IPDI, and HMDI with a polyol such as poly(propylene oxide)diol, poly(tetramethylene oxide)diol, ethoxylated bisphenol A, ethoxylated bisphenol S spiroglycol, caprolactone-modified diol, and carbonate diol, and a hydroxyacrylate such as 2-hydroxyethyl (meth)acrylate, 2-hydroxypropyl (meth)acrylate, glycidol di(meth)acrylate, and pentaerythritol triacrylate, and examples thereof include polyfunctional urethane monomers described in JP2002-265650A, JP2002-355936A, JP2002-067238A, and the like. Specific examples of the urethane acrylate include, but are not limited to, an adduct of TDI and hydroxyethyl acrylate, an adduct of IPDI and hydroxyethyl acrylate, an adduct of HDI and pentaerythritol triacrylate (PETA), a compound obtained by preparing an adduct of TDI and PETA and reacting the remaining isocyanate with dodecyloxyhydroxypropyl acrylate, an adduct of 6,6-nylon and TDI, and an adduct of pentaerythritol, TDI, and hydroxyethyl acrylate.

Examples of the commercially available products which can be suitably used as the (meth)acrylate monomer containing a urethane group include AH-600, AT-600, UA-306H, UA-306T, UA-3061, UA-510H, UF-8001G, and DAUA-167, all manufactured by Kyoeisha Chemical Co., Ltd., UA-160™ manufactured by Shin-Nakamura Chemical Co., Ltd., and UV-4108F and UV-4117F, both manufactured by Osaka Organic Chemical Industry Ltd. These can be used singly or in combination of two or more kinds thereof.

Examples of the (meth)acrylate monomer containing a hydroxyl group include compounds synthesized by the reaction of a compound having an epoxy group with a (meth)acrylic acid. Typically, the compounds are classified into ones of a bisphenol A type, a bisphenol S type, a bisphenol F type, an epoxidized oil type, a novolac type of phenol, and an alicyclic type phenol for the compounds having an epoxy group. Specific examples thereof include, but not limited to, a (meth)acrylate obtained by reacting an adduct of bisphenol A and epichlorohydrin with (meth)acrylic acid, a (meth)acrylate obtained by reacting phenol novolac with epichlorohydrin, and then with (meth)acrylic acid, a (meth)acrylate obtained by reacting an adduct of bisphenol S and epichlorohydrin with (meth)acrylic acid, and a (meth)acrylate obtained by reacting an epoxidized soy bean oil with (meth)acrylic acid. In addition, other examples of the (meth)acrylate monomer containing a hydroxyl group include (meth)acrylate monomers having a carboxyl group or a phosphoric acid group at a terminal.

Examples of the commercially available products which can be suitably used as the second curable compound containing a hydroxyl group include Epoxy Ester, M-600A, 40EM, 70PA, 200PA, 80MFA, 3002M, 3002A, 3000MK, and 3000A, all manufactured by Kyoeisha Chemical Co., Ltd., 4-Hydroxybutyl Acrylate manufactured by Nippon Kasei Chemical Co., Ltd., Monofunctional Acrylate A-SA and Monofunctional Methacrylate SA, both manufactured by Shin-Nakamura Chemical Co., Ltd., Monofunctional Acrylate 3-Carboxyethyl Acrylate manufactured by Daicel-Allnex Ltd., and JPA-514 manufactured by Johoku Chemical Co, Ltd. These can be used singly or in combination of two or more kinds thereof.

The mass ratio of the first curable compound to the second curable compound may be 10:90 to 99:1, and is preferably 10:90 to 90:10. It is preferable that the content of the first curable compound is larger than that of the second curable compound, and specifically, the ratio of (the content of the first curable compound)/(the content of the second curable compound) is preferably 2 to 10.

In a case of using a resin formed by curing the first curable compound and the second curable compound as the binder, it is preferable that a monofunctional (meth)acrylate monomer is further included as the curable composition. Examples of the monofunctional (meth)acrylate monomer include acrylic acids and methacrylic acids, and derivatives thereof, and more specifically monomers having one polymerizable unsaturated bond ((meth)acryloyl groups) of a (meth)acrylic acid in the molecule. Specific examples thereof include the following compounds, but the present invention is not limited thereto:

alkyl (meth)acrylates with an alkyl group having 1 to 30 carbon atoms, such as methyl (meth)acrylate, n-butyl (meth)acrylate, isobutyl (meth)acrylate, 2-ethylhexyl (meth)acrylate, isononyl (meth)acrylate, n-octyl (meth)acrylate, lauryl (meth)acrylate, and stearyl (meth)acrylate; arylalkyl (meth)acrylates with an arylalkyl group having 7 to 20 carbon atoms, such as benzyl (meth)acrylate; alkoxyalkyl (meth)acrylates with an alkoxyalkyl group having 2 to 30 carbon atoms, such as butoxyethyl (meth)acrylate; aminoalkyl (meth)acrylate with a (mono-alkyl or di-alkyl) aminoalkyl group having 1 to 20 carbon atoms in total, such as N,N-dimethylaminoethyl (meth)acrylate; (meth)acrylates of polyalkylene glycol alkyl ether with an alkylene chain having 1 to 10 carbon atoms and a terminal alkyl ether having 1 to 10 carbon atoms, such as (meth)acrylate of diethylene glycol ethyl ether, (meth)acrylate of triethylene glycol butyl ether, (meth)acrylate of tetraethylene glycol monomethyl ether, (meth)acrylate of hexaethylene glycol monomethyl ether, monomethyl ether (meth)acrylate of octaethylene glycol, monomethyl ether (meth)acrylate of nonaethylene glycol, monomethyl ether (meth)acrylate of dipropylene glycol, monomethyl ether (meth)acrylate of heptapropylene glycol, and monoethyl ether (meth)acrylate of tetraethylene glycol; (meth)acrylates of polyalkylene glycol aryl ether with an alkylene chain having 1 to 30 carbon atoms and a terminal aryl ether having 6 to 20 carbon atoms, such as (meth)acrylate of hexaethylene glycol phenyl ether; (meth)acrylate having 4 to 30 carbon atoms in total, having an alicyclic structure, such as cyclohexyl (meth)acrylate, dicyclopentanyl (meth)acrylate, isobornyl (meth)acrylate, and methylene oxide adduct cyclodecatriene (meth)acrylate; fluorinated alkyl (meth)acrylates having 4 to 30 carbon atoms in total, such as heptadecafluorodecyl (meth)acrylate; (meth)acrylates having a hydroxyl group, such as 2-hydroxyethyl (meth)acrylate, 3-hydroxypropyl (meth)acrylate, 4-hydroxybutyl (meth)acrylate, mono(meth)acrylate of triethylene glycol, tetraethylene glycol mono(meth)acrylate, hexaethylene glycol mono(meth)acrylate, octapropylene glycol mono(meth)acrylate, and mono- or di-(meth)acrylate of glycerol; (meth)acrylates having a glycidyl group such as glycidyl (meth)acrylate; polyethylene glycol mono(meth)acrylates with an alkylene chain having 1 to 30 carbon atoms such as tetraethylene glycol mono(meth)acrylate, hexaethylene glycol mono(meth)acrylate, and octapropylene glycol mono(meth)acrylate; and (meth)acrylamides such as (meth)acrylamide, N,N-dimethyl (meth)acrylamide, N-isopropyl (meth)acrylamide, 2-hydroxyethyl (meth)acrylamide, and acryloylmorpholine.

The monofunctional (meth)acrylate monomers are included in an amount of preferably 1 to 300 parts by mass, and more preferably 50 to 150 parts by mass, with respect to 100 parts by mass of the total mass of the first curable compound and the second curable compound.

Furthermore, compounds containing a long-chain alkyl group having 4 to 30 carbon atoms are preferably included. Specifically, it is preferable that at least one of the first curable compound, the second curable compound, or the monofunctional (meth)acrylate monomer contains a long-chain alkyl group having 4 to 30 carbon atoms. The long-chain alkyl group is more preferably a long-chain alkyl group having 12 to 22 carbon atoms since the dispersibility of quantum dots is improved. The more the dispersibility of quantum dots is enhanced, the more the amount of light advancing directly from a light conversion layer to the light emission surface is increased, which is effective for improving a front brightness and a front contrast.

Specifically, as the monofunctional (meth)acrylate monomer containing a long-chain alkyl group having 4 to 30 carbon atoms, butyl (meth)acrylate, octyl (meth)acrylate, lauryl (meth)acrylate, oleyl (meth)acrylate, stearyl (meth)acrylate, behenyl (meth)acrylate, butyl (meth)acrylamide, octyl (meth)acrylamide, lauryl (meth)acrylamide, oleyl (meth)acrylamide, stearyl (meth)acrylamide, behenyl (meth)acrylamide, and the like are preferable. Among these, lauryl (meth)acrylate, oleyl (meth)acrylate, and stearyl (meth)acrylate are particularly preferable.

Furthermore, a compound having a fluorine atom, such as trifluoroethyl (meth)acrylate, pentafluoroethyl (meth)acrylate, (perfluorobutyl)ethyl (meth)acrylate, perfluorobutylhydroxypropyl (meth)acrylate, (perfluorohexyl)ethyl (meth)acrylate, octafluoropentyl (meth)acrylate, perfluorooctylethyl (meth)acrylate, and tetrafluoropropyl (meth)acrylate, may be included as the curable compound. By the incorporation of these compounds, the coatability can be improved.

In the quantum dot layer 32, the amount of the binder is not particularly limited, and may be appropriately set, depending on the type of curable compound to be used, the thickness of the quantum dot layer 32, and the like.

According to the studies of the present inventors, the amount of the binder is preferably 90 to 99.9 parts by mass, and more preferably 92 to 99 parts by mass, with respect to 100 parts by mass of the total amount of the quantum dot layer 32.

The thickness of the quantum dot layer 32 is not particularly limited, but is preferably 5 to 200 µm, and more preferably 10 to 150 µm.

It is preferable to set the thickness of the quantum dot layer 32 to 5 µm or more, for example, in views that good light emitting characteristics are obtained.

It is preferable to set the thickness of the quantum dot layer 32 to 200 µm or less, for example, in views that the wavelength conversion film 30 can be prevented from being unnecessarily thick, a wavelength conversion film 30 having good handleability is obtained, or a quantum dot layer 32 having sufficient curability can be formed. The quantum dot layer 32 having sufficient curability means a quantum dot layer 32 having no aggregation peeling.

The quantum dot layer 32, that is, the wavelength conversion film 30 may be formed by a known method for forming a layer formed of organic compounds, depending on the forming materials of the quantum dot layer 32.

First, the gas barrier film 10 was manufactured as described above. Further, for the manufacture of the gas barrier film 34, it is necessary to form the light diffusion layer 20 in the manufacture of the gas barrier film 10.

On the other hand, a coating composition (polymerizable composition) which becomes the quantum dot layer 32 is prepared by dispersing quantum dots in the curable compound which becomes a binder. This coating composition may also contain a photopolymerization initiator, a surfactant, or the like, if desired.

When the gas barrier film 10 and the gas barrier film 34 are manufactured and the coating composition which becomes the quantum dot layer 32 is prepared, the coating composition is applied onto the adhesive layer 18 of either the gas barrier film 10 or the gas barrier film 34.

Then, the other gas barrier film 10 or gas barrier film 34 is laminated to the adhesive layer 18, facing the coating composition.

When the coating composition which becomes the quantum dot layer 32 is sandwiched between the gas barrier films 10, the curable compound which becomes a binder in the coating composition is polymerized by the irradiation with ultraviolet rays, and thus, a quantum dot layer 32 is formed, thereby manufacturing a wavelength conversion film 30.

Since the curable compound (preferably (meth)acrylate) which becomes a binder, the (meth)acryloyl group of the phosphoric acid compound and/or the (meth)acryloyl group of the silane coupling agent in the adhesive layer 18, and the terminal (meth)acryloyl group of the side chain of the urethane polymer are reacted with and bonded to each other as described above when the curable compound which becomes the binder is polymerized, the quantum dot layer 32 and the adhesive layer 18 are adhered to each other with high adhesiveness.

In addition, in the light diffusion layer 20 of the gas barrier film 10, the uncrosslinked terminal acryloyl groups in the side chain are crosslinked by the irradiation with ultraviolet rays, the graft copolymers are crosslinked, and the binder is completely cured, thereby completing the light diffusion layer 20.

As described above, in the production of the wavelength conversion film 30, ultraviolet rays are irradiated only once. Thus, yellowing or the like of the wavelength conversion layer 20 caused by the irradiation with ultraviolet rays is prevented, and thus, the wavelength conversion film 30 having excellent optical characteristics is obtained.

The production of such a wavelength conversion film 30 is also preferably carried out by R-to-R.

Hereinabove, the functional composite film and the wavelength conversion film of the present invention are described in detail, but the present invention is not limited to Examples. It is certain that various modifications or alterations may be made within a range not departing from the gist of the present invention.

EXAMPLES

Hereinbelow, the present invention will be described in more detail with reference to specific Examples of the present invention.

Example 1

<Manufacture of Gas Barrier Film>

A gas barrier film having an underlying organic layer 14, an inorganic layer 16, and a light diffusion layer 20 on a support 12 was manufactured. That is, this gas barrier film is a gas barrier film having the same configuration as that of the gas barrier film 10 shown in FIGS. 1 and 2, except that the adhesive layer 18 was not included.

In addition, a gas barrier film was manufactured in the same manner as above, except that the light diffusion layer 20 was not formed. That is, this gas barrier film is also a gas barrier film having the same configuration as that of the gas barrier film 34 shown in FIG. 3, except that the adhesive layer 18 was not included.

As the support 12, a PET film (COSMO SHINE A4300 manufactured by Toyobo Co., Ltd.) having a width of 1,000 mm, a thickness of 50 µm, and a length of 100 m was used.

<<Formation of Underlying Organic Layer 14>>

TMPTA (manufactured by Daicel-Cytec Co., Ltd.) and a photopolymerization initiator (ESACURE KTO 46 manufactured by Lamberti S.p.A.) were prepared and weighed such that the mass ratio thereof was 95:5. These were dissolved in methyl ethyl ketone (MEK) such that the concentration of the solid content was 15% by mass, thereby preparing a coating composition for forming an underlying organic layer 14.

The coating composition for forming a underlying organic layer 14 was loaded in a predetermined position of a coating unit of a film forming device using general R-to-R, including the coating unit with a die coater, a drying unit using warm air, and a curing unit using irradiation with ultraviolet rays. Further, a roll formed by winding the support 12 into a roll shape was loaded in a predetermined position of the film forming device, and the support 12 was inserted through a predetermined transport path.

In the film forming device, while transporting the support 12 in the longitudinal direction, the coating composition was applied using the die coater, and passed through a drying unit at 50° C. for 3 minutes. Thereafter, the coating composition was cured by the irradiation with ultraviolet rays (integrated irradiation dose of about 600 mJ/cm$^2$), and wound to obtain a roll having the underlying organic layer 14 formed on the support 12. The thickness of the underlying organic layer 14 was 1 µm.

<<Formation of Inorganic Layer 16>>

The roll of the support 12 having the underlying organic layer 14 formed thereon was loaded in a predetermined position of a general CVD film forming device which performs film formation by CCP-CVD (capacity coupled plasma CVD) using R-to-R, and the support 12 was inserted through a predetermined transport path.

In this CVD film forming device, while the support 12 having the underlying organic layer 14 formed thereon was transported in the longitudinal direction, a silicon nitride film as the inorganic layer 16 was formed on the underlying organic layer 14.

As raw material gases, silane gas (flow rate of 160 sccm), ammonia gas (flow rate of 370 sccm), hydrogen gas (flow rate of 590 sccm), and nitrogen gas (flow rate of 240 sccm) were used. As a power supply, a high-frequency power supply having a frequency of 13.56 MHz was used, and a plasma excitation electric power was set to 800 W. The film forming pressure was set to 40 Pa. The film thickness of the inorganic layer 16 was 50 nm.

<<Formation of Light Diffusion Layer 20>>

A binder (ACRYD 8BR-930 manufactured by Taisei Fine Chemical Co., Ltd.), a light diffusing agent (silicone resin particles, TOSPEARL 130 manufactured by Momentive Performance Materials Inc., an average particle diameter of 3.0 µm, and a refractive index of 1.425), and a photopolymerization initiator (IRGACURE 184 manufactured by BASF) were weighed such that the mass ratio thereof was 30:68:2, and were dissolved in methyl ethyl ketone (MIBK) such that the concentration of the solid content was 55% by mass to prepare a coating composition for forming the light diffusion layer 20. That is, the mass ratio of the mass of the binder/the mass of the light diffusing agent is 0.44.

Furthermore, ACRIT 8BR-930 used as the binder is a graft copolymer having a weight-average molecular weight of 16,000, a double bond equivalent of 800 g/mol, and a refractive index of 1.4671, which has an acrylic polymer as the main chain, and a urethane polymer with an acryloyl group at a terminal and a urethane oligomer with an acryloyl group at a terminal in the side chain.

The coating composition for forming the light diffusion layer 20 was loaded in a predetermined position of a coating unit of a film forming device using general R-to-R, including the coating unit with a die coater and a drying zone using heating. Further, a roll of the support 12 having the inorganic layer 16 formed thereon was loaded in a predetermined position of the film forming device, and inserted through a predetermined transport path. Further, the loading of the support 12 was performed such that the coating composition was applied onto the surface opposite to the surface on which the inorganic layer 16 or the like was formed.

In the film forming device, while the support 12 was transported in the longitudinal direction, the coating composition was applied using the die coater, passed through a drying unit at 60° C. for 3 minutes, and then wound. Thus, a gas barrier film having the underlying organic layer 14 and the inorganic layer 16 on one surface of the support 12 and the light diffusion layer 20 on the other surface of the support, as shown in FIG. 1, was manufactured. In addition, the amount of the coating composition which would become the light diffusion layer 20 was set to 35 mL (liter)/m$^2$. The thickness of the light diffusion layer 20 thus formed, was 17 μm.

As described above, for the gas barrier film 34, such formation of the light diffusion layer 20 was not performed.

<Manufacture of Wavelength Conversion Film>

A composition having the following compositional ratio was prepared.

| | |
|---|---|
| Quantum dot dispersion liquid 1 having a light emission wavelength of 535 nm | 10 parts by mass |
| Quantum dot dispersion liquid 2 having a light emission wavelength of 630 nm | 10 parts by mass |
| Lauryl methacrylate | 80.8 parts by mass |
| Trimethylolpropane triacrylate | 18.2 parts by mass |
| Photopolymerization initiator (IRGACURE 819 manufactured by BASF) | 1 part by mass |

Furthermore, CZ520-100 manufactured by NN-LABS, LLC was used as the quantum dot dispersion 1 having a light emission wavelength of 535 nm. Further, CZ620-100 manufactured by NN-LABS, LLC was used as the quantum dot dispersion 2 having a light emission wavelength of 630 nm. These are both quantum dots using CdSe as a core, ZnS as a shell, and octadecylamine as a ligand, and were dispersed at a concentration of 3% by mass in toluene. In addition, the quantum dot dispersion liquids were all used after being regulated to have a quantum dot concentration of 1% by mass.

This composition was filtered with a PP-made filter having a pore diameter of 0.2 μm, and then dried under reduced pressure for 30 minutes to prepare a coating composition which would become the quantum dot layer 32.

The coating composition for forming the quantum dot layer 32 was loaded in a predetermined position of a coating unit of a film forming device using general R-to-R, including the coating unit with a die coater, a laminator, and a curing unit using irradiation with ultraviolet rays.

Furthermore, the roll formed by winding the gas barrier film which formed the light diffusion layer 20 was loaded in a predetermined position of the film forming device, and the gas barrier film was inserted through a predetermined transport path which was inserted through the coating unit, the laminator, and the curing unit. Incidentally, the roll formed by winding the gas barrier film which did not form the light diffusion layer 20 was loaded in a predetermined position of the film forming device, and the gas barrier film was inserted through a predetermined transport path which was inserted through the laminator and the curing unit. The gas barrier film that passed through the coating unit was loaded in the film forming device such that the inorganic layer 16 became the surface on which the coating composition was applied. Further, both gas barrier films were loaded in the film forming device such that the inorganic layers 16 faced each other.

While transporting the two gas barrier films at a transport speed of 1 m/min and a tension of 60 N/m, the coating composition was applied onto the gas barrier film that passed through the coating unit to form a coating film having a thickness of 50 μm.

Subsequently, the gas barrier film having the coating film formed thereon was transported while being supported by a backup roller, and the other gas barrier film was laminated thereon by the laminator. The temperature of the backup roller was regulated to 30° C.

Furthermore, while the coating film was transported in a state where the film was sandwiched between the two gas barrier films, the coating composition was cured by irradiation with ultraviolet rays in the curing unit, and the quantum dot layer 32 was formed and wound. Thus, the same wavelength conversion film as shown in FIG. 2, except the adhesive layer 18 having the quantum dot layer 32 sandwiched between the two gas barrier films was not included, was manufactured.

In addition, the film thickness of the formed quantum dot layer 32 was 50 μm. Further, by using a 160 W/cm air-cooled metal halide lamp (manufactured by Eye Graphics Co., Ltd.) in the curing unit, the integrated irradiation dose of ultraviolet rays was about 2,000 mJ/cm$^2$.

Example 2

In the same manner as in Example 1, except that ACRIT 8UX-015A manufactured by Taisei Fine Chemical Co., Ltd. was used in addition to ACRIT 8BR930 manufactured by Taisei Fine Chemical Co., Ltd. as the binder, a coating composition which would become the light diffusion layer 20 was prepared. Further, the amount of the binder in the coating composition which would become the light diffusion layer 20 was the same as in Example 1, and the mass ratio of ACRIT 8BR930 to ACRIT 8UX-015A was set to 15:85.

ACRIT 8UX-015A which was added to the binder is an ultraviolet-curable urethane acrylate having a weight-average molecular weight of 1,000 to 2,000.

In the same manner as in Example 1, except that this coating composition was used to form the light diffusion layer 20, a gas barrier film was manufactured. Further, in the same manner as in Example 1, except that this gas barrier film was used, a wavelength conversion film was manufactured.

The refractive index of the binder was measured by Multi-Wavelength Abbe Refractometer DR-M2 manufactured by Atago Co., Ltd., and the refractive index was 1.48.

Example 3

In the same manner as in Example 1, except that ACRIT 8DK-3000 manufactured by Taisei Fine Chemical Co., Ltd. was used in addition to ACRIT 8BR930 manufactured by Taisei Fine Chemical Co., Ltd. as the binder, a coating composition which would become the light diffusion layer 20 was prepared. Further, the amount of the binder in the coating composition which would become the light diffusion layer 20 was the same as in Example 1, and the mass ratio of ACRIT 8BR930 to ACRIT 8DK-3000 was set to 15:85.

ACRIT 8DK-3000 which was added to the binder is an ultraviolet-curable acrylic polymer having a weight-average molecular weight of 5,000 and a double bond equivalent of 400 g/mol.

In the same manner as in Example 1, except that this coating composition was used to form the light diffusion layer 20, a gas barrier film was manufactured. Further, in the same manner as in Example 1, except that this gas barrier film was used, a wavelength conversion film was manufactured.

The refractive index of the binder was measured by Multi-Wavelength Abbe Refractometer DR-M2 manufactured by Atago Co., Ltd., and the refractive index was 1.58.

Example 4

In the same manner as in Example 1, except that the mass ratio of the binder:the light diffusing agent:the photopolymerization initiator was set to 19:79:2, a coating composition which would become the light diffusion layer 20 was prepared. That is, the mass ratio of the mass of the binder/the mass of the light diffusing agent was 0.24.

In the same manner as in Example 1, except that this coating composition was used to form the light diffusion layer 20, a gas barrier film was manufactured. Further, in the same manner as in Example 1, except that this gas barrier film was used, a wavelength conversion film was manufactured.

Example 5

In the same manner as in Example 1, except that the mass ratio of the binder:the light diffusing agent:the photopolymerization initiator was set to 39:59:2, a coating composition which would become the light diffusion layer 20 was prepared. That is, the mass ratio of the mass of the binder/the mass of the light diffusing agent was 0.66.

In the same manner as in Example 1, except that this coating composition was used to form the light diffusion layer 20, a gas barrier film was manufactured. Further, in the same manner as in Example 1, except that this gas barrier film was used, a wavelength conversion film 30 was manufactured.

Example 6

In the same manner as in Example 1, except that TOSPEARL 130 manufactured by Momentive Performance Materials Inc. and TOSPEARL 1100 (silicone resin particles, an average particle diameter of 11.0 µm, and a refractive index of 1.425) manufactured by Momentive Performance Materials Inc. were used as a light diffusing agent, a coating composition which would become the light diffusion layer 20 was prepared. The amounts of the respective components to be added were set such that the mass ratio of the binder:TOSPEARL 130:TOSPEARL 1100:the photopolymerization initiator was 30:34:34:2. That is, the mass ratio of the mass of the binder/the mass of the light diffusing agent was 0.44, and the mass ratio of the mass of the small-diameter particles/mass of the large-diameter particles was 1.

In the same manner as in Example 1, except that this coating composition was used to form the light diffusion layer 20, a gas barrier film was manufactured. Further, in the same manner as in Example 1, except that this gas barrier film was used, a wavelength conversion film was manufactured.

Example 7

In the same manner as in Example 1, except that TOSPEARL 130 manufactured by Momentive Performance Materials Inc. and TOSPEARL 1100 manufactured by Momentive Performance Materials Inc. were used as a light diffusing agent, a coating composition which would become the light diffusion layer 20 was prepared. The amounts of the respective components to be added were set such that the mass ratio of the binder:TOSPEARL 130:TOSPEARL 1100: the photopolymerization initiator was 30:28:40:2. That is, the mass ratio of the mass of the binder/the mass of the light diffusing agent was 0.44, and the mass ratio of the mass of the small-diameter particles/mass of the large-diameter particles was 0.7.

In the same manner as in Example 1, except that this coating composition was used to form the light diffusion layer 20, a gas barrier film was manufactured. Further, in the same manner as in Example 1, except that this gas barrier film was used, a wavelength conversion film was manufactured.

Example 8

In the same manner as in Example 1, except that TOSPEARL 130 manufactured by Momentive Performance Materials Inc. and TOSPEARL 1100 manufactured by Momentive Performance Materials Inc. were used as a light diffusing agent, a coating composition which would become the light diffusion layer 20 was prepared. The amounts of the respective components to be added were set such that the mass ratio of the binder:TOSPEARL 130:TOSPEARL 100: the photopolymerization initiator was 30:20:50:2. That is, the mass ratio of the mass of the binder/the mass of the light diffusing agent was 0.43, and the mass ratio of the mass of the small-diameter particles/mass of the large-diameter particles was 0.4.

In the same manner as in Example 1, except that this coating composition was used to form the light diffusion layer 20, a gas barrier film was manufactured. Further, in the same manner as in Example 1, except that this gas barrier film was used, a wavelength conversion film was manufactured.

Example 9

In the same manner as in Example 1, except that the thickness of the light diffusion layer 20 was set to 8 µm, a gas barrier film was manufactured. Further, in the same manner as in Example 1, except that this gas barrier film was used, a wavelength conversion film was manufactured.

Example 10

In the same manner as in Example 1, except that the thickness of the light diffusion layer 20 was set to 25 µm, a gas barrier film was manufactured. Further, in the same manner as in Example 1, except that this gas barrier film was used, a wavelength conversion film was manufactured.

Example 11

In the same manner as in Example 1, except that blast drying was performed at room temperature as a temperature in the drying zone, and then ultraviolet rays were irradiated at an integrated irradiation dose of about 5,000 mJ/cm$^2$ in the formation of the light diffusion layer 20, a gas barrier film was manufactured. That is, in the present example, in the same manner as in Example 1, except that the light diffusion layer 20 was cured with ultraviolet rays (UV-cured), a gas barrier film was manufactured.

In addition, in the same manner as in Example 1, except that this gas barrier film was used, a wavelength conversion film was manufactured.

Example 12

In the same manner as in Example 1, except that an adhesive layer 18 was formed on an inorganic layer 16, the gas barrier film 10 and the gas barrier film 34 were manufactured (see FIGS. 1 and 2).

In addition, in the same manner as in Example 1, except that these gas barrier films 10 and 34 were used, a wavelength conversion film 30 was manufactured (see FIG. 2).

Furthermore, the adhesive layer 18 was formed in the following manner.

<<Formation of Adhesive Layer 18>>

A UV-curable urethane polymer (ACRIT 8UH-1006 manufactured by Taisei Fine Chemical Co., Ltd.), a urethane polyester (VYLON UR1410 manufactured by Toyobo Co., Ltd.), a phosphoric acid compound (bis[2-(methacryloyloxy)ethyl] phosphate manufactured by Sigma Aldrich (CAS32435-46-4), and a silane coupling agent (KBM5103 manufactured by Shin-Etsu Silicone Co., Inc.) were weighed such that the mass ratio of the UV-curable urethane polymer: the urethane polyester:the phosphoric acid compound:the silane coupling agent was 50:15:25:10, and dissolved in MEK such that the concentration of the solid content was 2% by mass, thereby preparing a coating composition for forming the adhesive layer 18.

Furthermore, ACRIT 8UH-1006 used as the UV-curable urethane polymer is a ultraviolet-curable urethane polymer having a weight-average molecular weight of 20,000 and a double bond equivalent of 366 g/mol, which has a urethane polymer as the main chain and a side chain having a (meth)acryloyl group at a terminal.

The coating composition for forming the adhesive layer 18 was loaded in a predetermined position of a coating unit of a film forming device using general R-to-R, including the coating unit with a die coater and a drying zone using heating. Further, a roll of the support 12 having the inorganic layer 16 formed thereon was loaded in a predetermined position of the film forming device, and inserted through a predetermined transport path.

In the film forming device, while transporting the support 12 in the longitudinal direction, the coating composition was applied using the die coater, passed through a drying unit at 110° C. for 3 minutes, and wound to form the adhesive layer 18.

In addition, the amount of the coating composition to be applied was set to 5 mL (liter)/m$^2$. The thickness of the adhesive layer 18 thus formed, was 100 nm.

Example 13

In the same manner as in Example 12, except that a photopolymerization Initiator (ESACURE KT046 manufactured by Lamberti SpA.) was added, a coating composition for forming the adhesive layer 18 was prepared. The amounts of the respective components to be added were set such that the mass ratio of the UV-curable urethane polymer: the urethane polyester:the phosphoric acid compound:silane coupling agent:the photopolymerization initiator was 48:15:25:10:2.

In the same manner as in Example 12, except that this coating composition was used to form the adhesive layer 18, gas barrier films 10 and 34 were manufactured. Further, in the same manner as in Example 1, except that these gas barrier films 10 and 34 were used, a wavelength conversion film 30 was manufactured.

Example 14

In the same manner as in Example 12, except that a lubricant (CAB-SiL Grade M5 manufactured by CABOT) was added, a coating composition for forming the adhesive layer 18 was prepared. The amounts of the respective components to be added were set such that the mass ratio of the UV-curable urethane polymer:the urethane polyester:the phosphoric acid compound:silane coupling agent:the lubricant was 49.5:15:25:10:0.5.

In the same manner as in Example 12, except that this coating composition was used to form the adhesive layer 18, gas barrier films 10 and 34 were manufactured. Further, in the same manner as in Example 1, except that these gas barrier films 10 and 34 were used, a wavelength conversion film 30 was manufactured.

Example 15

In the same manner as in Example 12, except that the thickness of the adhesive layer 18 was set to 1,000 nm, gas barrier films 10 and 34 were manufactured. Further, in the same manner as in Example 1, except that these gas barrier films 10 and 34 were used, a wavelength conversion film 30 was manufactured.

Example 16

In the same manner as in Example 12, except that the thickness of the adhesive layer 18 was set to 20 nm, gas barrier films 10 and 34 were manufactured. Further, in the same manner as in Example 1, except that these gas barrier films 10 and 34 were used, a wavelength conversion film 30 was manufactured.

Example 17

In the same manner as in Example 12, except that blast drying was performed at room temperature as a temperature in the drying zone, and then ultraviolet rays were irradiated at an integrated irradiation dose of about 2,000 mJ/cm$^2$ in the formation of the adhesive layer 18, gas barrier films 10 and 34 were manufactured. That is, in the present example, in the same manner as in Example 12, except that the adhesive layer 18 was cured with ultraviolet rays, gas barrier films 10 and 34 were manufactured.

In addition, in the same manner as in Example 1, except that these gas barrier films 10 and 34 were used, a wavelength conversion film 30 was manufactured.

Example 18

In the same manner as in Example 12, except that blast drying was performed at room temperature as a temperature in the drying zone, and then ultraviolet rays were irradiated at an integrated irradiation dose of about 2,000 mJ/cm$^2$ in the formation of the adhesive layer 18, and blast drying was performed at room temperature as a temperature in the drying zone, and then ultraviolet rays were irradiated at an integrated irradiation dose of about 2,000 mJ/cm² in the formation of the light diffusion layer 20, gas barrier films 10 and 34 were manufactured. That is, in the present example, in the same manner as in Example 12, except that the adhesive layer 18 and the light diffusion layer 20 were cured with ultraviolet rays, gas barrier films 10 and 34 were manufactured.

In addition, in the same manner as in Example 1, except that these gas barrier films 10 and 34 were used, a wavelength conversion film 30 was manufactured.

Example 19

A composition having the following compositional ratio was prepared.

| | |
|---|---|
| Quantum dot dispersion liquid 1 having a light emission wavelength of 535 nm | 10 parts by mass |
| Quantum dot dispersion liquid 2 having a light emission wavelength of 630 nm | 10 parts by mass |
| Epoxy compound (CELLOXIDE 2021 P manufactured by Daicel Corporation) | 97 parts by mass |
| Polymerization initiator (SP-170 manufactured by ADEKA) | 3 parts by mass |

Furthermore, the quantum dot dispersion 1 having a light emission wavelength of 535 nm and the quantum dot dispersion 2 having a light emission wavelength of 630 nm were each the same as those in Example 1, and similarly, were used after being regulated to have a quantum dot concentration of 1% by mass.

In the same manner as in Example 1, except that this coating composition was used to form a quantum dot layer 32, and the same gas barrier films 10 and 34 as used in Example 12 were used, a wavelength conversion film 30 was manufactured.

Comparative Example 1

In the same manner as in Example 1, except that the binder was changed to ACRIT 8BR930 manufactured by Taisei Fine Chemical Co., Ltd., and TMPTA (refractive index of 1.475) was used, a coating composition which would become a light diffusion layer was prepared.

In the same manner as in Example 1, except that this coating composition was used to form a light diffusion layer by ultraviolet curing, a gas barrier film was manufactured. In addition, in the same manner as in Example 1, except that this gas barrier film was used, a wavelength conversion film was manufactured.

Furthermore, in this wavelength conversion film, the light diffusion layer resulted in the occurrence of film peeling.

Comparative Example 2

In the same manner as in Example 1, except that the binder was changed to ACRIT 8BR930 manufactured by Taisei Fine Chemical Co., Ltd. and DPHA (refractive index of 1.49) was used, a coating composition which would become a light diffusion layer was prepared.

In the same manner as in Example 1, except that this coating composition was used to form a light diffusion layer by ultraviolet curing, a gas barrier film was manufactured. In addition, in the same manner as in Example 1, except that this gas barrier film was used, a wavelength conversion film was manufactured.

Furthermore, in this wavelength conversion film, the light diffusion layer resulted in the occurrence of film peeling.

Comparative Example 3

In the same manner as in Example 1, except that the binder was changed to ACRIT 8BR930 manufactured by Taisei Fine Chemical Co., Ltd., and OGSOL EA-200 by Osaka Gas Chemicals Co., Ltd. was used, a coating composition which would become a light diffusion layer was prepared.

OGSOL EA-200 used as the binder is an acrylate monomer having a fluorene skeleton, and has a refractive index of 1.6.

In the same manner as in Example 1, except that this coating composition was used to form a light diffusion layer by ultraviolet curing, a gas barrier film was manufactured. In addition, in the same manner as in Example 1, except that this gas barrier film was used, a wavelength conversion film was manufactured.

Furthermore, in this wavelength conversion film, the light diffusion layer resulted in the occurrence of film peeling.

Comparative Example 4

In the same manner as in Example 1, except that the binder was changed to ACRIT 8BR930 manufactured by Taisei Fine Chemical Co., Ltd. and acrylic polyol (manufactured by Dainippon Ink and Chemicals, Inc., refractive index of 1.45) was used, a coating composition which would become a light diffusion layer was prepared.

In the same manner as in Example 1, except that this coating composition was used to form a light diffusion layer, a gas barrier film was manufactured. That is, in the present example, the light diffusion layer was formed by thermal curing. In addition, in the same manner as in Example 1, except that this gas barrier film was used, a wavelength conversion film was manufactured.

Furthermore, in this wavelength conversion film, scratches were generated in the light diffusion layer, and a reduction in brightness or bright spot failures occurred.

[Evaluation]

The wavelength conversion films thus manufactured were evaluated in the following manner.

<Haze>

The haze of the manufactured wavelength conversion film was measured in accordance with JIS K 7136, using NDH 5000 manufactured by Nippon Denshoku Industries, Co., Ltd.

<Transmittance>

The total light transmittance of the manufactured wavelength conversion film was measured in accordance with JIS K 7361, using NDH 5000 manufactured by Nippon Denshoku Industries. Co., Ltd.

<Measurement of Brightness>

The manufactured wavelength conversion film was cut into a predetermined size, using a Thomson blade.

A commercially available tablet terminal (Kindle Fire HDX 7™ manufactured by Amazon) including a blue light source in a backlight unit was disassembled to extract the backlight unit. The wavelength conversion film that had been cut into a predetermined size was placed on the light guide plate of the backlight unit, and two prism sheets taken out from the tablet terminal were arranged to overlap such that the directions of the concave and convex surface patterns were orthogonally crossed.

The backlighting unit was switched on and the brightness was measured with a brightness meter (SR3 manufactured by TOPCON Corporation) installed at a position 740 mm apart in a vertical direction from the surface of the backlight unit.

A case where the measured brightness was 15,300 cd/m$^2$ or more, was evaluated as A; a case where the measured brightness was 14,800 cd/m$^2$ or more and less than 15,300 cd/m$^2$, was evaluated as B;

a case where the measured brightness was 14,300 cd/m$^2$ or more and less than 14,800 cd/m$^2$, was evaluated as C;

a case where the measured brightness was 13,800 cd/m$^2$ or more and less than 14,300 cd/m$^2$, was evaluated as D; and a case where the measured brightness was less than 13,800 cd/m$^2$ was evaluated as E.

<Adhesiveness>

The adhesiveness of the manufactured wavelength conversion film was measured by a 180° peeling test method in accordance with JIS Z 0237 2009. Specifically, a sample was cut into 25×50 mm strips, 5 mm of the upper portion was peeled in the longitudinal direction and the remainder was peeled with a peel tester to measure the adhesive force.

A case where the adhesive force was more than 10 N/25 mm was evaluated as AA; a case where the adhesive force was more than 8 N/25 mm and 10 N/25 mm or less was evaluated as A;

a case where the adhesive force was more than 6 N/25 mm and 8 N/25 mm or less was evaluated as B;

a case where the adhesive force was more than 4 N/25 mm and 6 N/25 mm or less was evaluated as C;

a case where the adhesive force was more than 2 N/25 mm and 4 N/25 mm or less was evaluated as D; and a case where the adhesive force was 2 N/25 mm or less was evaluated as E.

<Measurement of Brightness Unevenness>

In order to confirm that there was no peeling due to the processing, the following brightness measurement was carried out.

The manufactured wavelength conversion film was cut into a predetermined size, using a Thomson blade.

A commercially available tablet terminal (Kindle Fire HDX 7™ manufactured by Amazon) including a blue light source in a backlight unit was disassembled to extract the backlight unit. The wavelength conversion film that had been cut into a predetermined size was placed on the light guide plate of the backlight unit, and two prism sheets taken out from the tablet terminal were arranged to overlap such that the directions of the concave and convex surface patterns were orthogonally crossed.

The backlighting unit was switched on and the brightness was measured with a brightness meter (SR3 manufactured by TOPCON Corporation) installed at a position 740 mm apart in a vertical direction from the surface of the backlight unit at five points at constant intervals on both the diagonal lines from the edge. Further, the average value of the six points on the center and the average value of the four points on the edge were calculated, and the reduction rate of the average value on the edge relative to the average value of the center was calculated.

A case where the reduction rate of brightness was 5% or less was evaluated as A;

a case where the reduction rate of brightness was more than 5% and 10% or less was evaluated as B;

a case where the reduction rate of brightness was more than 10% and 20% or less was evaluated as C;

a case where the reduction rate of brightness was more than 20% and 30% or less was evaluated as D; and a case where the reduction rate of brightness was more than 30% was evaluated as E.

The above results are shown in the following table.

TABLE 1

| | Adhesive layer | | | Light diffusion layer | | | | |
| | | | | Binder | | Light diffusing agent (particle) | | |
| | | | | | | Particle | | |
| | Thickness [μm] | Additive | Curing | Type | Refractive index | diameter [μm] | Curing | Mass ratio of binder/particles |
|---|---|---|---|---|---|---|---|---|
| Example 1 | — | — | — | Graft copolymer | 1.4671 | 3 | Heat | 0.44 |
| Example 2 | — | — | — | Mixing | 1.48 | 3 | Heat | 0.44 |
| Example 3 | — | — | — | Mixing | 1.58 | 3 | Heat | 0.44 |
| Example 4 | — | — | — | Graft copolymer | 1.4671 | 3 | Heat | 0.24 |
| Example 5 | — | — | — | Graft copolymer | 1.4671 | 3 | Heat | 0.66 |
| Example 6 | — | — | — | Graft copolymer | 1.4671 | 3/11 | Heat | 0.44 |
| Example 7 | — | — | — | Graft copolymer | 1.4671 | 3/11 | Heat | 0.44 |
| Example 8 | — | — | — | Graft copolymer | 1.4671 | 3/11 | Heat | 0.43 |
| Example 9 | — | — | — | Graft copolymer | 1.4671 | 3 | Heat | 0.44 |
| Example 10 | — | — | — | Graft copolymer | 1.4671 | 3 | Heat | 0.44 |
| Example 11 | — | — | — | Graft copolymer | 1.4671 | 3 | UV | 0.44 |
| Example 12 | 100 | — | Heat | Graft copolymer | 1.4671 | 3 | Heat | 0.44 |
| Example 13 | 100 | Initiator | Heat | Graft copolymer | 1.4671 | 3 | Heat | 0.44 |
| Example 14 | 100 | Lubricant | Heat | Graft copolymer | 1.4671 | 3 | Heat | 0.44 |
| Example 15 | 1,000 | — | Heat | Graft copolymer | 1.4671 | 3 | Heat | 0.44 |
| Example 16 | 20 | — | Heat | Graft copolymer | 1.4671 | 3 | Heat | 0.44 |
| Example 17 | 100 | — | UV | Graft copolymer | 1.4671 | 3 | Heat | 0.44 |
| Example 18 | 100 | — | UV | Graft copolymer | 1.4671 | 3 | UV | 0.44 |
| Example 19 | 100 | — | Heat | Graft copolymer | 1.4671 | 3 | Heat | 0.44 |
| Comparative Example 1 | — | — | — | Acrylate | 1.47 | 3 | UV | 0.44 |
| Comparative Example 2 | — | — | — | Acrylate | 1.48 | 3 | UV | 0.44 |

TABLE 1-continued

| | | | | | | | |
|---|---|---|---|---|---|---|---|
| Comparative Example 3 | — | — | — | Acrylate | 1.6 | 3 | UV | 0.44 |
| Comparative Example 4 | — | — | — | Acrylate polyol | 1.45 | 3 | Heat | 0.44 |

| | Light diffusion layer | | | | | | |
|---|---|---|---|---|---|---|---|
| | Mass ratio of large-diameter particles/small-diameter particles | Thickness [μm] | Haze [%] | Transmittance [%] | Brightness | Adhesiveness | Brightness unevenness |
| Example 1 | — | 17 | 90 | 88 | A | C | C |
| Example 2 | — | 17 | 95 | 86 | B | C | C |
| Example 3 | — | 17 | 98 | 83 | C | C | C |
| Example 4 | — | 17 | 85 | 90 | A | C | C |
| Example 5 | — | 17 | 93 | 85 | B | C | C |
| Example 6 | 1 | 17 | 93 | 90 | A | C | C |
| Example 7 | 0.7 | 17 | 89 | 91 | A | C | C |
| Example 8 | 0.4 | 17 | 87 | 92 | A | C | C |
| Example 9 | — | 8 | 87 | 90 | A | C | C |
| Example 10 | — | 25 | 96 | 86 | B | C | C |
| Example 11 | — | 17 | 90 | 82 | C | C | C |
| Example 12 | — | 17 | 90 | 88 | A | A | A |
| Example 13 | — | 17 | 90 | 88 | A | AA | A |
| Example 14 | — | 17 | 90 | 88 | A | AA | A |
| Example 15 | — | 17 | 90 | 88 | A | B | B |
| Example 16 | — | 17 | 90 | 88 | A | AA | A |
| Example 17 | — | 17 | 90 | 88 | A | B | B |
| Example 18 | — | 17 | 90 | 82 | C | C | C |
| Example 19 | — | 17 | 90 | 88 | A | C | C |
| Comparative Example 1 | — | 17 | 90 | 75 | E | E | E |
| Comparative Example 2 | — | 17 | 95 | 70 | E | E | E |
| Comparative Example 3 | — | 17 | 98 | 65 | E | D | D |
| Comparative Example 4 | — | 17 | 80 | 60 | E | C | C |

The refractive indices of the light diffusing agents (light scattering particles) are all 1.425.
The mixing in Example 2 refers to the mixing of graft copolymers and urethane acrylate; the mixing in Example 3 refers to the mixing of graft copolymers and acryl polymers; and in Examples 4 to 6, the light diffusing agent is a mixture of materials having a particle diameter of 3.0 μm and materials having a particle diameter of 10.0 μm.
Only in Example 19, the binder of the quantum dot layer is an epoxy resin, and the other binders are all acrylic resins.

As shown in Table 1, according to the present invention, a wavelength conversion film having good haze and transmittance by preventing the binder of the light diffusion layer 20 from yellowing, and having high brightness, low brightness unevenness, and good adhesiveness was obtained. Among those, in Examples 6 to 8 in which two kinds of light diffusing agents (light diffusing particles) having different particle diameters are used, the transmittance is high, good light scattering properties are obtained, and the brightness is also high.

Furthermore, in Examples 12 to 19 in which the adhesive layer 18 is formed, most of the materials exhibit high adhesiveness and have low brightness unevenness in view of high adhesiveness. Among those, in Example 13 in which a photopolymerization initiator is added to the adhesive layer 18, and in Example 10 in which a lubricant is added to the adhesive layer 18, high adhesiveness is obtained.

In Comparative Examples 1 to 3 in which a light diffusion layer is formed by the irradiation with ultraviolet rays, using an acrylate, not a graft copolymer, as the binder of the light diffusion layer, the optical characteristics are poor due to yellowing of the binder of the light diffusion layer, curls are generated, and thus, the adhesiveness is also low. In Comparative Example 4 in which a urethane polyol is used as the binder of the light diffusion layer, the hardness of the binder is low, damages on the light diffusion layer are generated, and thus, the brightness is low.

From the above results, the effect of the present invention is apparent.

The present invention can suitably be used in the production of a functional laminated film such as a wavelength conversion film or in the production of a liquid crystal display.

EXPLANATION OF REFERENCES

10, 34 Gas barrier films
12 Support
14 Underlying organic layer
16 Inorganic layer
18 Adhesive layer
20 Light diffusion layer
30 Wavelength conversion film
32 Quantum dot layer

What is claimed is:
1. A functional composite film comprising:
one or more combinations of an inorganic layer and an organic layer which becomes an underlying base of the inorganic layer on one surface of a support; and
a light diffusion layer on the opposite surface to the surface of the support on which the organic layer and the inorganic layer are formed, in which the light diffusion layer is formed by dispersing light diffusing agents in a binder formed using a graft copolymer having a weight-average molecular weight of 10,000 to 3,000,000 and a double bond equivalent of 500 g/mol or more, which has an acrylic polymer as the main chain and at least one of a urethane polymer with an acryloyl group at a terminal or a urethane oligomer with an acryloyl group at a terminal in the side chain.

2. The functional composite film according to claim 1, wherein the difference n1−n2 between the refractive index n1 of the binder and the refractive index n2 of the light diffusing agent is 0.02 to 0.07, and the refractive index n1 of the binder is less than 1.5 in the light diffusion layer.

3. The functional composite film according to claim 1, wherein the mass of the binder/the mass of the light diffusing agent, which is the ratio of the mass of the binder to the mass of the light diffusing agent, is 0.1 to 0.8 in the light diffusion layer.

4. The functional composite film according to claim 1, wherein the light diffusion layer contains two kinds of light diffusing agents having different sizes.

5. The functional composite film according to claim 4, wherein the particle diameter of the smaller light diffusing agents is 1 to 5 μm and the particle diameter of the larger light diffusing agents is 8 to 15 μm in the two kinds of light diffusing agents.

6. The functional composite film according to claim 4, wherein the mass of the small-diameter particles/the mass of the large-diameter particles, which is the ratio of a sum of the masses of the smaller light diffusing agents to a sum of the masses of the larger light diffusing agents, is 0.67 to 1.5.

7. The functional composite film according to claim 1, wherein the light diffusing agents are silicone resin particles.

8. The functional composite film according to claim 1, wherein the thickness of the light diffusion layer is 5 to 25 μm.

9. The functional composite film according to claim 1, wherein the binder of the light diffusion layer is thermally cured.

10. The functional composite film according to claim 1, wherein on the surface having one or more combinations of an inorganic layer and an organic layer which becomes an underlying base of the inorganic layer, the outermost surface has an adhesive layer, and
the adhesive layer is formed using an ultraviolet-curable urethane polymer having a weight-average molecular weight of 5,000 to 30,000 and a double bond equivalent of 300 g/mol or more, which has a urethane polymer as the main chain and a side chain having a (meth)acryloyl group at a terminal; a curable urethane polyester; and at least one of a phosphoric acid compound containing two or less (meth)acryloyl groups or a silane coupling agent containing one (meth)acryloyl group.

11. The functional composite film according to claim 10, wherein the adhesive layer includes a photopolymerization initiator.

12. The functional composite film according to claim 10, wherein the adhesive layer includes a lubricant.

13. The functional composite film according to claim 12, wherein the lubricant is a silicon particle.

14. The functional composite film according to claim 10, wherein the thickness of the adhesive layer is 10 to 1,000 nm.

15. The functional composite film according to claim 10, wherein the adhesive layer is formed by thermal curing.

16. A wavelength conversion film, comprising a quantum dot layer formed by dispersing quantum dots in a binder sandwiched between
the functional composite film according to claim 1 and
a gas barrier film having one or more combinations of an inorganic layer and an organic layer which becomes the underlying base of the inorganic layer on one surface of a support, with the surface of the inorganic layer side being the inner side.

17. The wavelength conversion film according to claim 16, wherein the gas barrier film has an organic layer which becomes an adhesive layer on the outermost surface of the surface on which the organic layer and the inorganic layer are formed.

18. The wavelength conversion film according to claim 17, wherein the adhesive layer of the gas barrier film is formed using an ultraviolet-curable urethane polymer having a weight-average molecular weight of 5,000 to 30,000 and a double bond equivalent of 300 g/mol or more, which has a urethane polymer as the main chain and a side chain having a (meth)acryloyl group at a terminal; a curable urethane polyester; and at least one of a phosphoric acid compound containing two or less (meth)acryloyl groups or a silane coupling agent containing one (meth)acryloyl group.

19. The wavelength conversion film according to claim 17, wherein the adhesive layer of the gas barrier film includes a photopolymerization initiator.

20. The wavelength conversion film according to claim 17, wherein the adhesive layer of the gas barrier film includes a lubricant.

21. The wavelength conversion film according to claim 20, wherein the lubricant is a silicon particle.

22. The wavelength conversion film according to claim 17, wherein the thickness of the adhesive layer of the gas barrier film is 10 to 1,000 nm.

23. The wavelength conversion film according to claim 17, wherein the adhesive layer of the gas barrier film is formed by thermal curing.

24. The wavelength conversion film according to claim 16, wherein the binder of the quantum dot layer is formed by polymerizing a compound having a molecular weight of 500 or less as a main component.

25. The wavelength conversion film according to claim 16, wherein the binder of the quantum dot layer is a (meth)acrylic resin.

26. The wavelength conversion film according to claim 17, wherein the quantum dot layer is formed by ultraviolet curing, and during the ultraviolet curing, the adhesive layer of the functional film and the adhesive layer of the gas barrier film are radically polymerized.

* * * * *